(12) United States Patent
Ogawa et al.

(10) Patent No.: US 11,169,392 B2
(45) Date of Patent: Nov. 9, 2021

(54) DISPLAY APPARATUS, OPTICAL ELEMENT, AND ELECTRONIC APPARATUS

(71) Applicant: SONY CORPORATION, Tokyo (JP)

(72) Inventors: Ryo Ogawa, Kanagawa (JP); Tomoya Yano, Kanagawa (JP); Hidetomo Miyake, Kanagawa (JP); Nobutake Iwase, Tokyo (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 16/088,180

(22) PCT Filed: Mar. 7, 2017

(86) PCT No.: PCT/JP2017/008985
§ 371 (c)(1),
(2) Date: Sep. 25, 2018

(87) PCT Pub. No.: WO2017/169566
PCT Pub. Date: Oct. 5, 2017

(65) Prior Publication Data
US 2020/0301162 A1  Sep. 24, 2020

(30) Foreign Application Priority Data
Mar. 30, 2016 (JP) .............................. JP2016-068975

(51) Int. Cl.
*G02B 30/27* (2020.01)
*G02B 30/29* (2020.01)
(Continued)

(52) U.S. Cl.
CPC ....... *G02B 30/27* (2020.01); *G02F 1/133526* (2013.01); *H04N 13/30* (2018.05)

(58) Field of Classification Search
CPC ........ G02B 30/27; G02B 30/00; G02B 30/36; G02F 2201/44; G02F 1/133526;
(Continued)

(56) References Cited

U.S. PATENT DOCUMENTS

| | | | |
|---|---|---|---|
| 2011/0075256 A1 | 3/2011 | De Zwart et al. | |
| 2012/0092763 A1* | 4/2012 | Song ..................... | H04N 13/305 359/463 |

(Continued)

FOREIGN PATENT DOCUMENTS

| | | |
|---|---|---|
| CA | 2902834 A1 | 9/2014 |
| CN | 102004324 A | 4/2011 |

(Continued)

OTHER PUBLICATIONS

International Search Report and Written Opinion of PCT Application No. PCT/JP2017/008985, dated May 30, 2017, 14 pages of ISRWO.

*Primary Examiner* — Mustak Choudhury
(74) *Attorney, Agent, or Firm* — Chip Law Group

(57) ABSTRACT

A display apparatus includes a display unit having a display area in which a two-dimensional image is displayed, and an optical element configured by disposing a plurality of structural bodies for separating the image displayed in the display area into images observed at predetermined observation positions arranged at intervals in a horizontal direction. In the display area, pixels are arranged in a matrix pattern in the horizontal direction and in a vertical direction, and pixels having different planar shapes are arranged for each row in a certain cycle, and the structural bodies of the optical element are disposed to be tilted at an inclination which satisfies (J+0.5)/3 (J is an integer of 3 or more) with respect to the vertical direction with a number of pixels as a unit.

6 Claims, 30 Drawing Sheets

(51) Int. Cl.
*G02F 1/1335* (2006.01)
*H04N 13/30* (2018.01)

(58) Field of Classification Search
CPC ........ G02F 1/13394; G09G 2300/0439; G09G 3/2074; H04N 13/312; H04N 13/315; H04N 13/317; H04N 13/32; H04N 13/324
See application file for complete search history.

(56) References Cited

U.S. PATENT DOCUMENTS

| | | | |
|---|---|---|---|
| 2012/0200562 A1 | 8/2012 | Kashiwagi et al. | |
| 2013/0265640 A1 | 10/2013 | Saito | |
| 2016/0014398 A1* | 1/2016 | Kroon | H04N 13/324 348/59 |

FOREIGN PATENT DOCUMENTS

| | | | |
|---|---|---|---|
| CN | 102047169 A | 5/2011 | |
| EP | 2286298 A1 | 2/2011 | |
| EP | 2976673 A1 | 1/2016 | |
| JP | 05-122733 A | 5/1993 | |
| JP | 2011-524541 A | 9/2011 | |
| JP | 2013-217951 A | 10/2013 | |
| JP | 2016-517025 A | 6/2016 | |
| KR | 10-2011-0016461 A | 2/2011 | |
| KR | 10-2015-0123834 A | 11/2015 | |
| WO | 2009/147588 A1 | 12/2009 | |
| WO | WO-2009147588 A1 * | 12/2009 | ............. G02B 30/26 |
| WO | 2011/033618 A1 | 3/2011 | |
| WO | 2014/147100 A1 | 9/2014 | |

* cited by examiner

Picture of actual machine

Simulation result

DISPLAY APPARATUS, OPTICAL ELEMENT, AND ELECTRONIC APPARATUS

CROSS REFERENCE TO RELATED APPLICATIONS

This application is a U.S. National Phase of International Patent Application No. PCT/JP2017/008985 filed on Mar. 7, 2017, which claims priority benefit of Japanese Patent Application No. JP 2016-068975 filed in the Japan Patent Office on Mar. 30, 2016. Each of the above-referenced applications is hereby incorporated herein by reference in its entirety.

TECHNICAL FIELD

The present technology relates to a display apparatus, an optical element, and an electronic apparatus. More specifically, the present technology relates to a display apparatus capable of achieving stereovision by displaying an image with a parallax, an optical element used in a display apparatus capable of achieving stereovision, and an electronic apparatus provided with such a display apparatus.

BACKGROUND ART

Various display apparatuses which achieve stereovision by observing an image with parallax by an image observer are known. As a glasses-free display apparatus, a display apparatus has been proposed in which an optical element for optical separation which is constituted of a parallax barrier, a lenticular lens provided with a lens sequence, and the like and a display unit which displays a two-dimensional image and is constituted of a liquid crystal display panel or the like are combined (see, for example, Japanese Patent Application Laid-open No. HEI 5-122733 (Patent Literature 1)).

FIGS. 30A and 30B show conceptual diagrams of a glasses-free display apparatus.

A light beam group emitted from pixels denoted by symbols $2_R$, $4_R$, $6_R$, and $8_R$ by an optical-separation optical element constituted of a lenticular lens reaches a point of view (see FIG. 30A). Further, a light beam group emitted from pixels denoted by symbols $1_L$, $3_L$, $5_L$, and $7_L$ reaches a point of view 2 (see FIG. 30B). Thus, on a position distanced from a display unit by a predetermined distance, an image at the point of view 1 and an image at the point of view 2 are independently observed.

When a right eye and a left eye of an image observer are positioned on the point of view 1 and the point of view 2, respectively, a right-eye image is displayed with the pixels denoted by the symbols $2_R$, $4_R$, $6_R$, and $8_R$, and a left-eye image is displayed with the pixels denoted by the symbols $1_L$, $3_L$, $5_L$, and $7_L$. As a result, the image observer recognizes the image as a stereoscopic image.

CITATION LIST

Patent Literature

Patent Literature 1: Japanese Patent Application Laid-open No. HEI 5-122733

DISCLOSURE OF INVENTION

Technical Problem

With a development of high resolution, a display unit having a structure in which pixels having different planar shapes are alternately arranged for each column has been proposed. For example, in a lateral electric field driven liquid crystal display panel with an in-plane switching (IPS) system, in order to obtain a wide viewing angle characteristic, a multi-domain structure in which a plurality of display areas having different planar shapes are disposed in one cell is used. However, when an area of the cell is decreased because of the achievement of the high resolution, it becomes difficult to dispose the plurality of display areas having different planar shapes in the one cell. For this reason, by alternately arranging the pixels having different planar shapes for each column, the wide viewing angle characteristic is maintained.

In a case of combining a display unit having a structure in which pixels having different planar shapes are disposed at certain intervals and an optical-separation optical element, moire may be caused due to an arrangement relationship among the pixels of the display unit. Further, it is desirable that a surface of an optical element using a lens sheet or the like be flat in a viewpoint of removal of dusts and abrasion resistance. If it is possible to reduce an interface reflection associated with the flattening, quality of an image can be increased.

An object of the present technology is to provide a display apparatus, an electronic apparatus, and an optical element capable of increasing the quality of an image to be displayed by reducing moire due to the arrangement relationship of the pixels of the display unit, for example.

Solution to Problem

To achieve the object described above, a display apparatus according to the present technology includes:

a display unit having a display area in which a two-dimensional image is displayed; and an optical element configured by disposing a plurality of structural bodies for separating the image displayed in the display area into images observed at predetermined observation positions arranged at intervals in a horizontal direction, in which in the display area, pixels are arranged in a matrix pattern in the horizontal direction and in a vertical direction, and pixels having different planar shapes are arranged for each row in a certain cycle, and the structural bodies of the optical element are disposed to be tilted at an inclination which satisfies (J+0.5)/3 (J: integer of 3 or more) with respect to the vertical direction with a number of pixels as a unit.

To achieve the object described above, an optical element according to the present technology includes:

a base material; and a lenticular lens unit that is formed on the base material, and is configured by arranging a plurality of lenses that constitute the structural bodies, in which a gap between the lenticular lens unit and a flat plate which faces the lenticular lens unit is filled with a resin layer having a refractive index different from that of a material that constitutes the lenticular lens unit.

To achieve the object described above, an electronic apparatus according to the present technology includes:

a display apparatus including
 a display unit having a display area in which a two-dimensional image is displayed, and
 an optical element configured by disposing a plurality of structural bodies for separating the image displayed in the display area into images observed at predetermined observation positions arranged at intervals in a horizontal direction, in which in the display area, pixels are arranged in a matrix pattern in the horizontal direction and in a vertical direction, and pixels having different planar shapes are arranged for each row in a certain cycle, and the structural bodies of the optical element are disposed to be tilted at an inclination which satisfies (J+0.5)/3 (J: integer of 3 or more) with respect to the vertical direction with a number of pixels as a unit.

Advantageous Effects of Invention

In the display apparatus according to the present technology, the inclination of the structural body of the optical element is caused to be in a predetermined state with respect to the vertical direction. As a result, moire caused due to a pixel positional relationship such that the pixels having different planar shapes are arranged for each row in a certain cycle. Further, in the optical element according to the present technology, reflection between the flat plate and the lenticular lens unit is reduced, so a reduction or the like in contrast due to reflection on an interface is reduced. Thus, in the display apparatus and the like according to the present technology, it is possible to increase the quality of the image to be displayed.

BRIEF DESCRIPTION OF DRAWINGS

FIG. 11A and FIG. 11B are diagrams for explaining a difference between a case where the symbol NP is an odd number and a case where the symbol NP is an even number, in which FIG. 11A is a diagram showing the center position to be observed shown in FIG. 9, and FIG. 11B is a diagram showing the center position to be observed shown in FIG. 10.

MODE(S) FOR CARRYING OUT THE INVENTION

Figure 1:
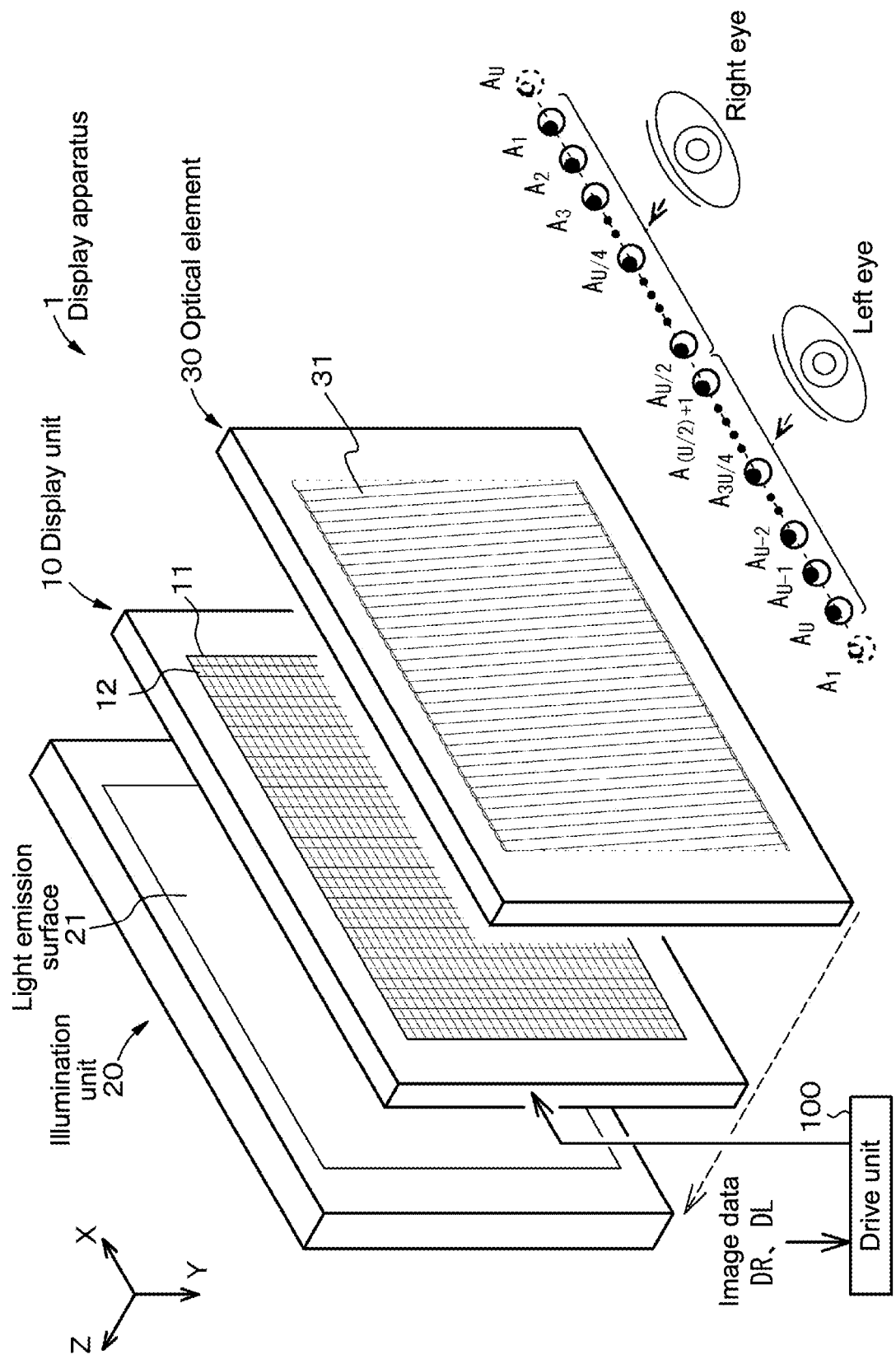
FIG. 1 A schematic perspective view at a time when a display apparatus used in a first embodiment is virtually separated.

Hereinafter, with reference to the drawings, the present technology will be described on a basis of embodiments. The present technology is not limited to the embodiments, and various numerical values and materials in the embodiments are merely examples. In the following description, the same elements or elements having the same functions are denoted by the same reference numerals or symbols, and overlapped description will be omitted. It should be noted that the description will be given in the following order.
1. General description relating to display apparatus, optical element, and electronic apparatus according to present technology
2. First Embodiment
3. Application example (example of electronic apparatus) and the like

[General Description Relating to Display Apparatus, Optical Element, and Electronic Apparatus According to Present Technology]

In a display apparatus according to the present technology or a display apparatus used in an electronic apparatus according to the present technology (hereinafter, those may simply be referred to as "display apparatus according to the present technology" collectively), the following configuration can be achieved:

pixels in a display area configure groups constituted of three pixels arranged in a row direction, and when a horizontal pitch of a structural body of an optical element using the number of pixels as a unit is represented by a symbol $LM_X$, an inclination of the structural body using the number of pixels as a unit is represented by a symbol SL, a vertical displacement using the number of pixels as a unit between a vertical center position of a given color of a pixel group observed through a given structural body and a vertical center position of the given color of a pixel group observed through a structural body arranged with one structural body intervened with respect to the given structural body is represented by a symbol OFS, and the number of pixel groups included in a horizontal width of the pixel observed through a given structural body and a pixel observed through a structural body with one structural body intervened with respect to a given structural body is represented as a symbol NP, the following configuration can be achieved:
the symbol $LM_X$ is a non-integer,
the symbol NP is an odd number, and
$2 \cdot LM_X = 3 \cdot NP + (OFS/SL)$ is established.

In the display apparatus according to the present technology which includes various desirable configuration described above, in the display area, two kinds of pixels having different planar shapes can be alternately arranged for each row.

In the display apparatus according to the present technology which includes various desirable configuration described above, the display unit can be constituted of a liquid crystal display panel.

In the display apparatus according to the present technology which includes various desirable configuration described above, the optical element can include a base material, and
a lenticular lens unit that is formed on the base material, and is configured by arranging a plurality of lenses that constitute the structural bodies, and a gap between the lenticular lens unit and a flat plate which faces the lenticular lens unit can be filled with a resin layer having a refractive index different from that of a material that constitutes the lenticular lens unit.

In the optical element according to the present technology and the optical element used for the display apparatus according to the present technology which includes the various desirable configurations described above (hereinafter, those may be simply referred to as "optical element according to the present technology" collectively), the lens that constitutes the structural body can have an aspherical shape.

In this case, the lens that constitutes the structural body can have a convex lens shape, and the resin layer can be made of a resin material having a refractive index lower than that of a material that constitutes the structural body. Further, the refractive index of the resin layer can be a value of 1.2 to 1.4.

Alternatively, in the configuration in which the lens that constitutes the structural body has the aspherical shape, the lens that constitutes the structural body can have a concave lens shape, and the resin layer can be made of a resin material having a refractive index higher than that of a material that constitutes the structural body. Further, the refractive index of the resin layer can be a value of 1.6 to 1.8.

In the optical element according to the present technology which includes the various desirable configurations described above, the resin layer can have a thickness of 40 µm or more.

In the optical element according to the present technology which includes the various desirable configurations described above, the resin layer can have an E hardness of 30 or less.

In the optical element according to the present technology which includes the various desirable configurations described above, the resin layer can have an elastic modulus of 500 kPa or less.

In the optical element according to the present technology which includes the various desirable configurations described above, the resin layer can be made of an ultraviolet curable resin material.

In the display apparatus according to the present technology or the display apparatus used for the electronic apparatus according to the present technology (hereinafter, those may be simply referred to as "display apparatus according to the present technology" collectively), a drive unit can select image data corresponding to pixels with which a right-eye image is to be displayed from right-eye image data for displaying the right-eye image on an entire surface of the display area and drive the pixels, and can select image data corresponding to pixels with which a left-eye image is to be displayed from left-eye image data for displaying the right-eye image on an entire surface of the display area and drive the pixels.

The display apparatus can have a configuration in which the optical element is disposed between the display unit and an image observer. As the display unit, a liquid crystal display panel, an electroluminescence display panel, or the like can be used. The display unit may perform monochrome displaying or color displaying.

A configuration, arrangement, or the like of the optical element may be set as appropriate in accordance with a specification of the display apparatus. In the case where a parallax barrier is used as the optical element, a fixed parallax barrier may be used, or a dynamically switchable parallax barrier may be used.

By using a base material made of a known transparent material such as resin and glass, a fixed parallax barrier can be formed by a known method such as a combination of a photolithography method and an etching method, various printing methods such as a screen printing method, an inkjet printing method, and a metal mask printing method, a plating method (electric plating method or electroless plating method), a liftoff method, or the like. On the other hand, a dynamically switchable parallax barrier can be configured by a light valve which is provided with a liquid crystal material layer and can be electrically switched, for example. There is no particular limitation on the kinds of the material that configures the light valve using the liquid crystal material layer, and an operation mode of the liquid crystal material layer. Depending on cases, the liquid crystal display panel for monochrome display can also be used as a parallax barrier. A size or the like of an opening portion of the parallax barrier may be set as appropriate in accordance with a specification or the like of the display apparatus.

Further, in a case where a lens sheet is used as the optical element, such a lens sheet that a lens sequence is formed by using, for example, a photosensitive resin material or the like on a sheet-shaped base material made of a known transparent material may be used.

In a configuration in which the display apparatus is provided with a transmissive display panel and an illumination unit, a widely known illumination unit can be used. A configuration of the illumination unit is not particularly limited. Generally, the illumination unit can be configured by a known member such as a light source, a prism sheet, a diffusion sheet, a light guide plate, or the like.

In an embodiment to be described later, an active matrix type transmissive liquid crystal display panel is used as a display unit, and an optical element in which a lens sequence as the structural body is formed is used.

The liquid crystal display panel is constituted of a front panel provided with a transparent common electrode, a rear panel provided with a transparent pixel electrode, and a liquid crystal material disposed between the front panel and the rear panel, for example. An operation mode of the liquid crystal display panel is not particularly limited. The liquid crystal display panel may be driven in a so-called TN mode or may be driven in a VA mode or an IPS mode. In a case of a color liquid crystal display panel, on an inner surface of a substrate, a color filter covered with an overcoat layer made of acrylic resin or epoxy resin is provided, and on the overcoat layer, a transparent common electrode is formed.

Specifically, examples of resolutions (P, Q) of the display unit include VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), QFHD (3840, 2160), (1920, 1035), (720, 480), (1280, 960), and the like as image display resolutions, but are not limited to those.

For example, a drive unit for driving the display unit can be configured by various circuits such as an image signal processing unit, a timing control unit, a data driver, and a gate driver. Those can be configured by using known circuit elements.

[Description of Display Apparatus Used in Embodiment]

FIG. 1 is a schematic perspective view when a display apparatus used in an embodiment is virtually separated.

As shown in FIG. 1, a display apparatus 1 is provided with:

a display unit 10 having a display area 11 for displaying a two-dimensional image; and an optical element 30 configured by a plurality of structural bodies 31 for separating an image displayed on the display area 11 into images to be observed on predetermined observation positions distanced in a horizontal direction at interval. The display unit 10 is driven by a drive unit 100.

On the display area 11, pixels 12 are arranged in a horizontal direction and in a vertical direction in a matrix pattern, and pixels having different planar shapes are disposed for each row in a certain cycle. The structural bodies 31 of the optical element 30 are disposed so as to be tilted, with respect to the vertical direction, at an inclination which satisfies (J+0.5)/3 (J: an integer of 3 or more) with the number of pixels 12 as a unit. Arrangement relationships of the structural bodies 31 and the pixels 12 will be described later in detail with reference to FIGS. 3, 4, 5, 6, 7, 8, 9, 10, 11A and 11B.

More specifically, the drive unit 100 selects, from right-eye image data for displaying a right-eye image on an entire surface of the display area 11, image data corresponding to pixels 12 for the right-eye image to be displayed, and drives the pixels 12, and selects, from left-eye image data for displaying a left-eye image on the entire surface of the display area 11, image data corresponding to pixels 12 for the left-eye image to be displayed, and drives the pixels 12. It should be noted that a configuration can be used in which a position of a head portion of an observer is detected, and active control is performed.

The display unit 10 is constituted of a liquid crystal display panel, more specifically, an IPS type color liquid crystal display panel. On a back surface of the display unit 10, an illumination unit 20 for emitting light is disposed.

Figure 2:
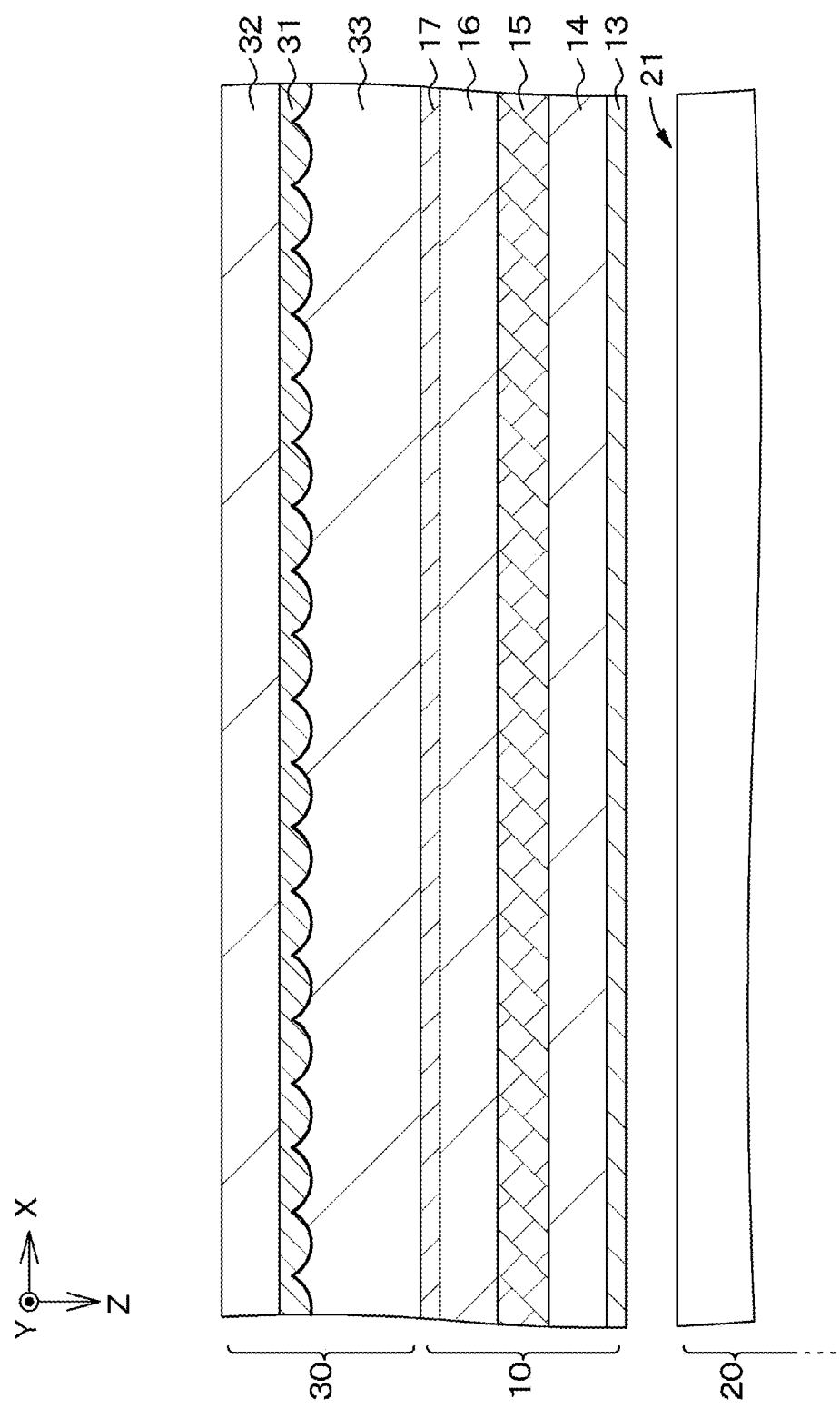
FIG. 2 A schematic cross-sectional view of a part of the display apparatus.

FIG. 2 is a schematic cross-sectional view showing a part of the display apparatus.

The display unit 10 is constituted of a front panel 16 on the optical element 30 side, a rear panel 14 on the illumination unit 20 side, a liquid crystal material layer 15 disposed between the front panel 16 and the rear panel 14, and the like. It should be noted that a wiring layer and a light shielding layer are not shown. On a surface of the rear panel 14 on the illumination unit 20 side, a polarization plate 13 is provided, and on a surface of the front panel 16, polarization plate 17 is provided. The polarization plates 13, 17 are provided in a relationship of crossed Nicol or parallel Nicol in accordance with a specification of the display unit 10.

The illumination unit 20 is constituted of a light source, a prism sheet, a diffusion sheet, a light guide plate (not shown), and the like. Diffusion light through the diffusion sheet or the like is emitted from a light emission surface 21 shown in FIG. 1 toward a back surface of the display unit 10.

On a front surface side of the display unit 10, the optical element 30 is provided in which the plurality of structural bodies 31 formed of the lenticular lenses are arranged.

An interval between the optical element 30 and the display unit 10 in a Z direction, a pitch of the pixels 12 in an X direction, an angle formed by a direction in which an opening portion 31 is extended and a Y direction, a pitch of the opening portion 31 in the X direction are set in such a manner that a condition which enables a desirable stereoscopic image to be observed on an observation position determined in accordance with the specification of the display apparatus 1 is satisfied.

As shown in FIG. 1, an assumption is made that an observation position $A_{U/4}$ is set to correspond to a right eye reference position, and an observation position $A_{3U/4}$ is set to correspond to a left eye reference position. A value of a symbol U may be set in accordance with the specification of the display apparatus 1, for example, a value of 24 or the like can be set.

The optical element 30 includes a base material 32 and a lenticular lens unit which is formed on the base material 32 and is configured by arranging a plurality of lenses that constitute the structural bodies 31. It should be noted that for convenience of description, the reference numeral 31 may denote the lenticular lens unit. A gap between the lenticular lens unit 31 and a flat plate which faces the lenticular lens unit 31 (liquid crystal display panel that constitutes the display unit 10 in this case) is filled with a resin layer 33 having a different refractive index from the material that constitutes the lenticular lens unit 31. The lens that constitutes the structural body 31 is an aspherical convex lens shape, and the resin layer 33 is made of a resin material having a refractive index lower than the material that constitutes the structural body 31. Those will be described in detail later with reference to FIG. 13 to FIG. 27.

Figure 3:
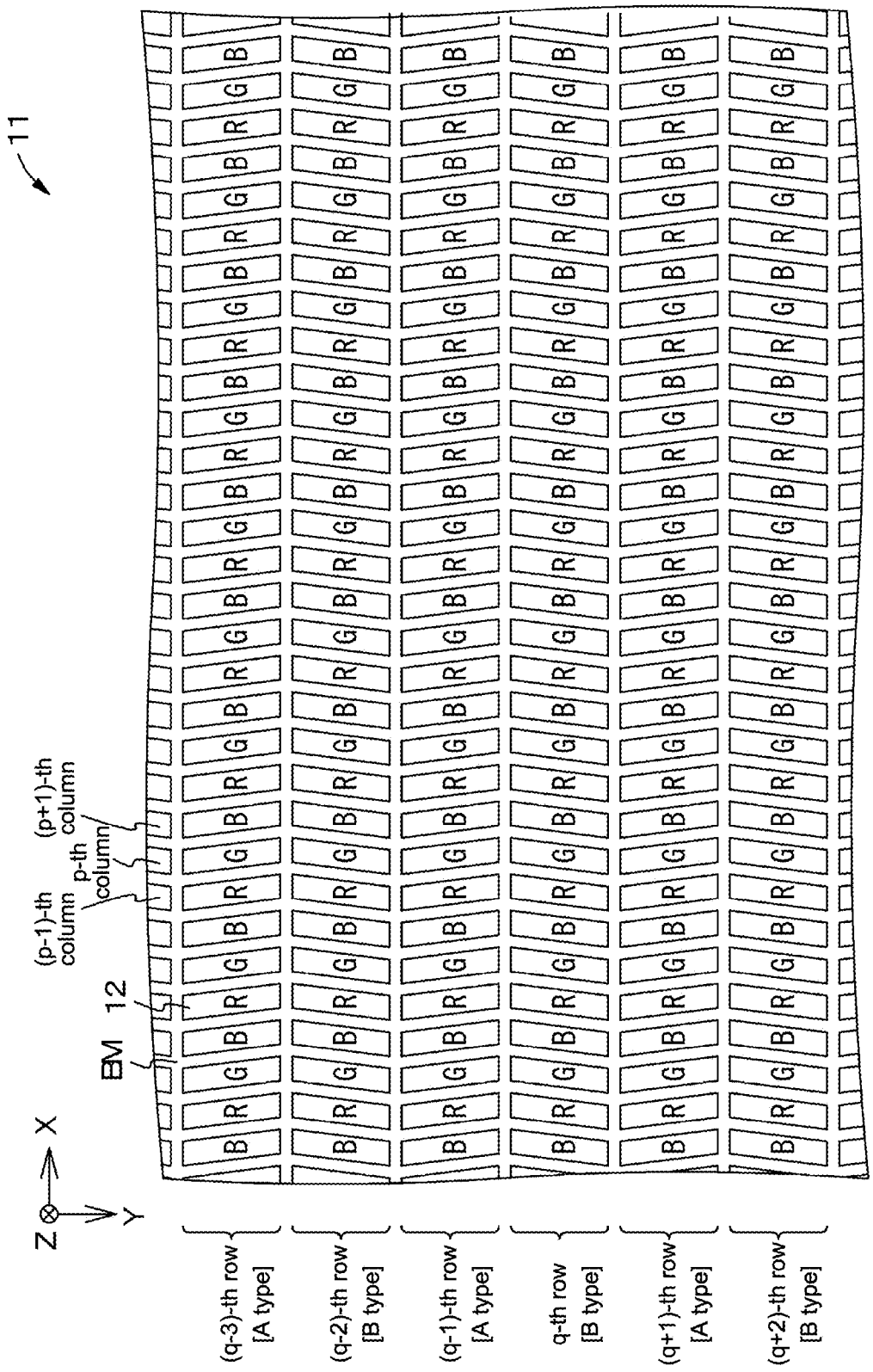
FIG. 3 A schematic plan view of a part of a display area in a display unit having a structure in which pixels having different planar shapes are alternately arranged.

FIG. 3 is a schematic plan view showing a part of the display area on the display unit having a structure in which the pixels having different planar shapes are arranged alternately for each row.

On the display area 11, P×Q pixels 12 are arranged in a matrix pattern in such a manner that P pixels in a horizontal direction (X direction in the figure) and Q pixels in a vertical direction (Y direction in the figure) are arranged. Between the pixel 12 and the pixel 12, a black matrix BM is provided. The pixel 12 in a p-th column (p=1, 2 . . . , P) and in a q-th row (q=1, 2 . . . , Q) are expressed as a (p, q)-th pixel 12 or a pixel (p, q). In FIG. 3, a red display pixel, a green display pixel, and a blue display pixel are expressed by using symbols R, G, B, respectively.

On the display area 11, the pixels 12 having different planar shapes are arranged for each row in a certain cycle. In the first embodiment, on the display area 11, two kinds of pixels having different planar shapes are alternately disposed. That is, the pixels 12 having a shape tilted in a (+X, +Y) direction (hereinafter, referred to as [A type]) and the pixels 12 having a shape tilted in a (−X, +Y) direction (hereinafter, referred to as [B type]) are alternately arranged for each row.

For the pixels 12, for example, on a first column, red display pixels are arranged, on a second column, green display pixels are arranged, and on a third column, blue display pixels are arranged. On a fourth column and subsequent thereto, pixels are arranged in a similar order repeatedly. The pixels on the display area 11 configures a pixel group constituted of three pixels arranged in the row direction. That is, the red display pixel, the green display pixel, and the blue display pixel arranged in the row direction constitute one pixel group.

A resolution of the display unit 10 shown in FIG. 1 is QFHD (3840, 2160). When one pixel of the display unit 10 is configured by a group of the red display pixel, the green display pixel, and the blue display pixel arranged in the horizontal direction, P=3840×3, Q=2160. That is, in the example described above, P=11520, Q=2160 are determined. Further, the display unit 10 has a diagonal size of approximately 13 inch, for example.

Figure 4:
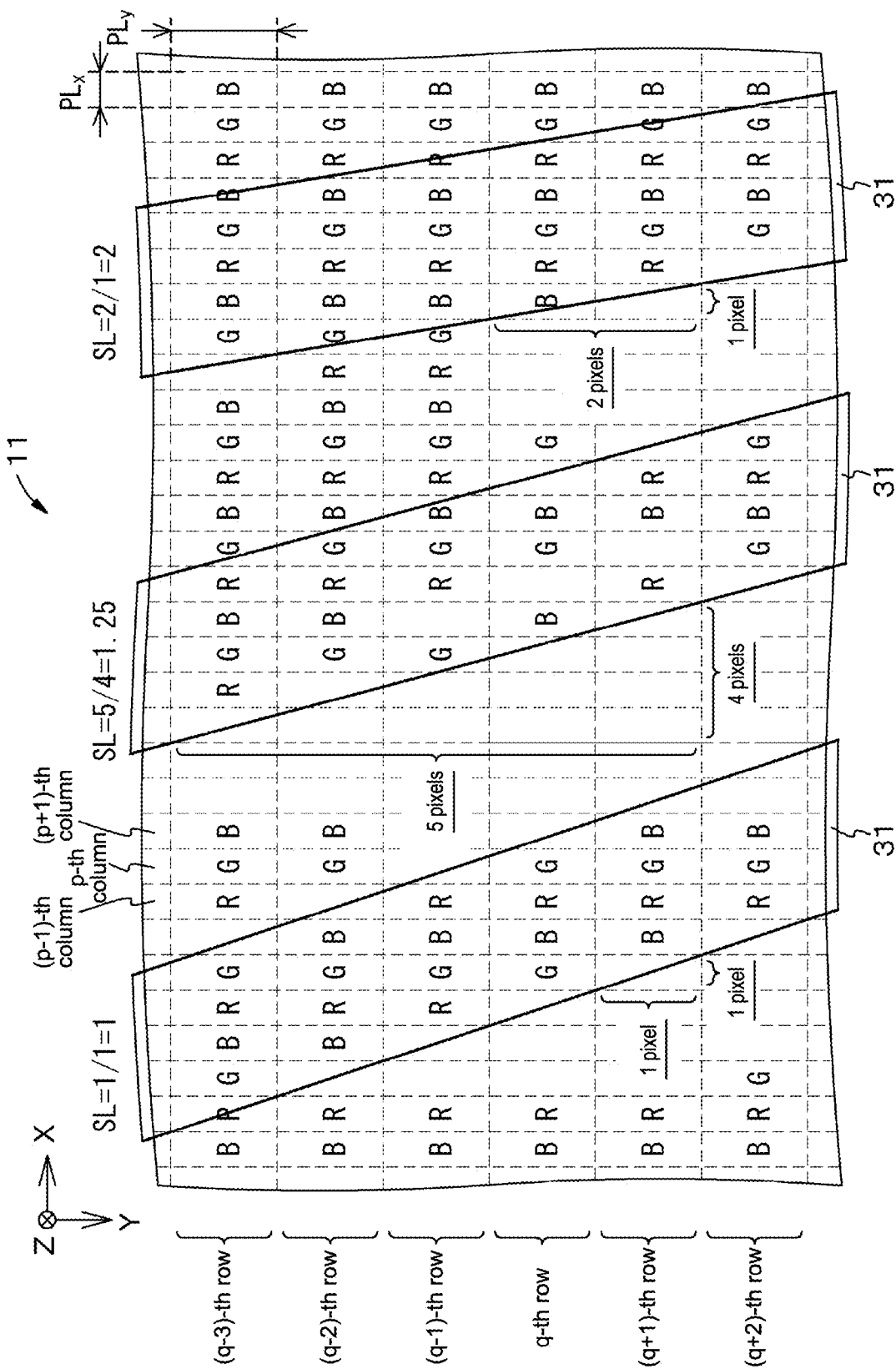
FIG. 4 A schematic plan view of an optical element and a part of a display area for explaining an arrangement relationship between a structural body of the optical element and pixels in the display area of the display unit.

FIG. 4 is a schematic plan view of an optical element and a part of a display area for explaining the structural body of the optical element and the pixels in the display area of the display unit. It should be noted that for convenience of description, the pixels have the same rectangles and planarly filled shape virtually. Further, a pitch of the pixels in the X direction is represented by a symbol $PL_X$, and a pitch of the pixels in the Y direction is represented by a symbol $PL_Y$. It should be noted that a relationship of $PL_Y=3 \times PL_X$ is established.

The structural bodies 31 of the optical element 30 are arranged so as to be tilted with respect to the vertical direction. An inclination is represented by a symbol SL. The inclination SL is calculated with the number of pixels 12 as a unit. As shown in FIG. 4, for example, in the case where each time shifting is performed in the X direction by one pixel, shifting is performed in the Y direction by one pixel, SL=1/1=1 is established. In the case where each time shifting is performed in the X direction by four pixels, shifting is performed in the Y direction by five pixels, SL=5/4=1.25 is established. In the case where each time shifting is performed in the X direction by one pixel, shifting is performed in the Y direction by two pixels, SL=2/1=2 is established.

Here, to help understanding the present technology, a phenomenon in a reference example in which the inclination of the structural bodies 31 is SL=1.25 will be described.

Figure 5:
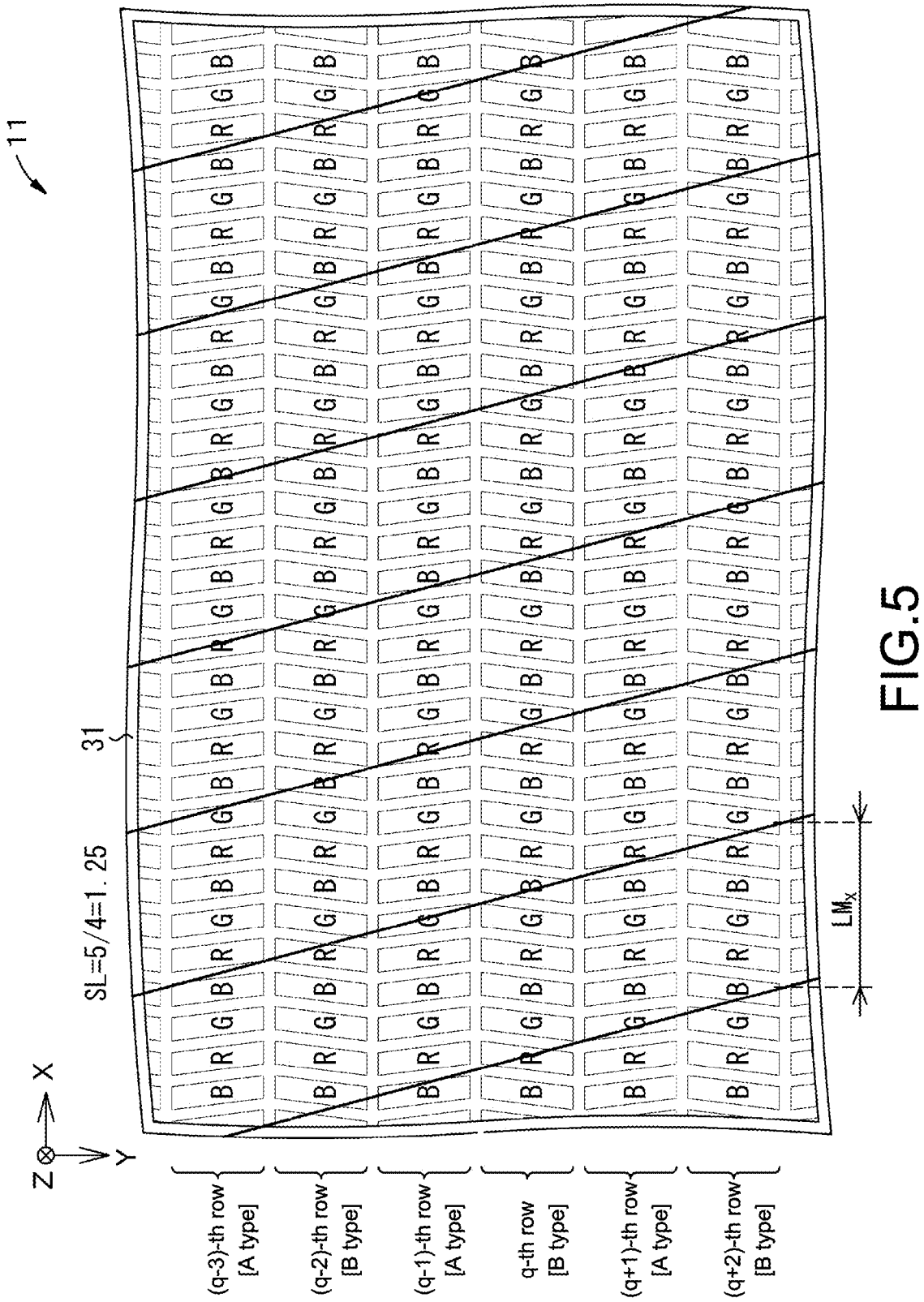
FIG. 5 A schematic plan view of an optical element and a part of a display area for explaining an arrangement relationship between a structural body of an optical element and pixels in an embodiment of a reference example.
Figure 6:
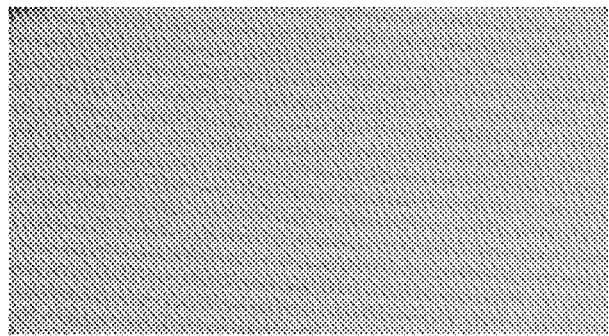
FIG. 6 A figure substitute picture for explaining moire in the embodiment of the reference example.
Figure 6:
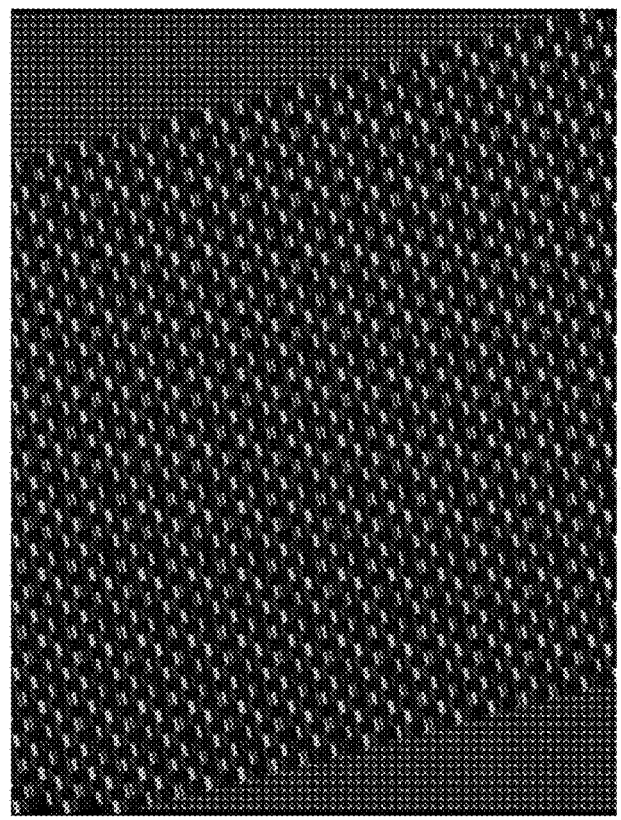

FIG. 5 is a schematic plan view of an optical element and a part of a display area for explaining a positional relationship between the structural bodies of the optical element in an embodiment of a reference example and the pixels. FIG. 6 is a figure substitute picture for explaining moire in the embodiment of the reference example.

The symbol $LM_X$ in FIG. 5 represents an arrangement pitch of the structural bodies 31 in the X direction. In this case, the arrangement pitch $LM_X=(24/5) \times PL_X$ is set.

In a case of the setting described above, depending on the positional relationship with the pixels having different shapes for each row as shown in FIG. 3, a phenomenon is caused in which A-type pixels 12 are mainly observed on a certain position, and on another position, B-type pixels 12 are mainly observed. This is a cause of the moire. A right side in FIG. 6 shows an image obtained by a simulation, and a left side in FIG. 6 shows a picture of an actual machine. Streaky moire markedly deteriorates quality of an image to be displayed.

As a result of study, an inventor of the present technology found that a degree of the streaky moire can be reduced by arranging the structural bodies 31 of the optical element 30 so as to be tilted with respect to the vertical direction at an inclination which satisfies (J+0.5)/3 (J: integer of 3 or more) with the number of pixels 12 as a unit.

Figure 7:
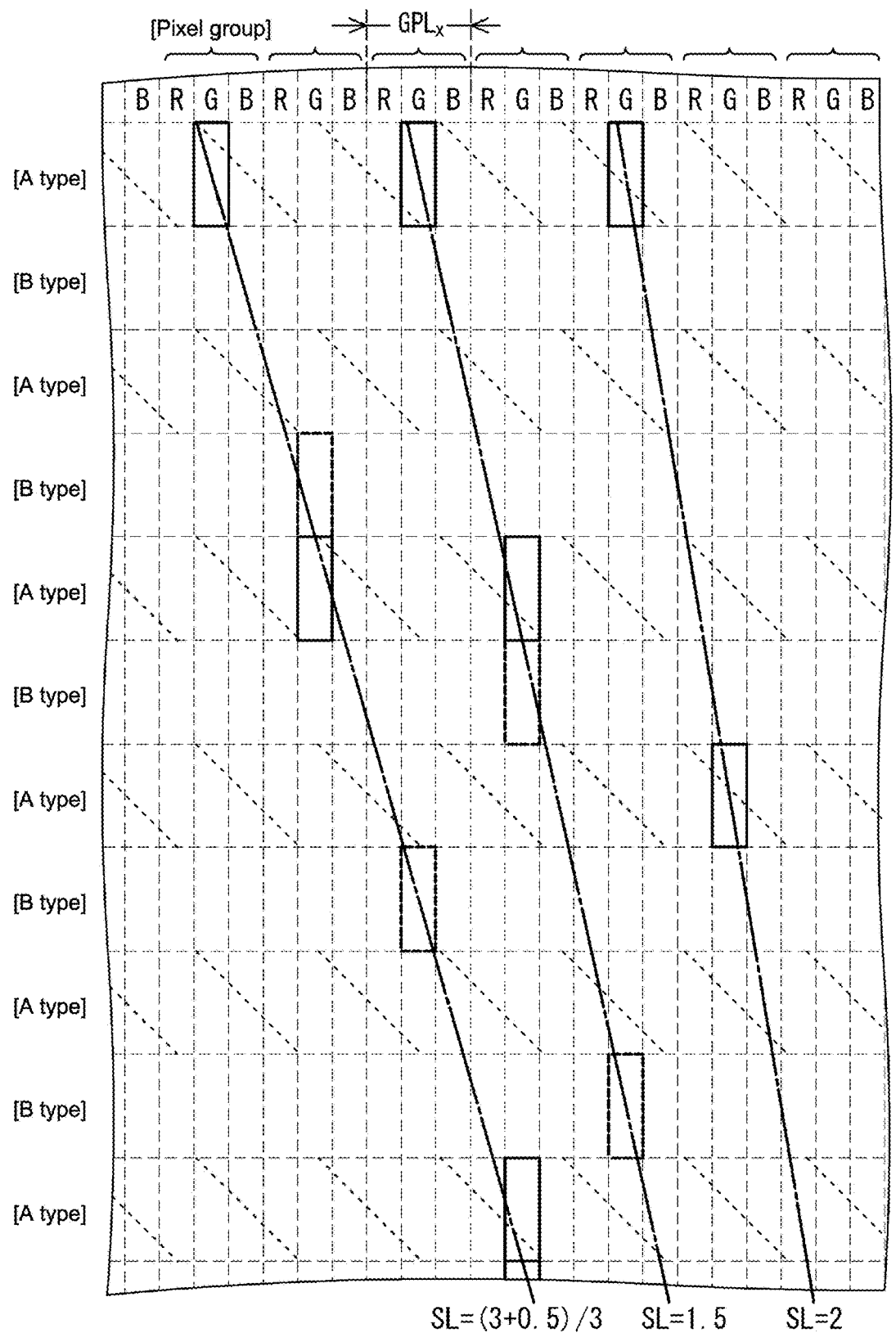
FIG. 7 a schematic plan view for explaining a relationship between an inclination of the structural body of the optical element and pixels to be observed.

FIG. 7 is a schematic plan view for explaining a relationship between the inclination of the structural body of the optical element and the pixels to be observed. It should be noted that for convenience of showing by the diagram, the difference of the shapes is expressed by indicating [A type] and [B type], and on the figure, the pixels have the same rectangles and planarly filled shape virtually.

For example, in a case of the inclination SL=2, for a pixel with the same color (for example, green), mainly, a pixel of the same type ([A type] in the example in the figure) is observed. Further, in the case of the inclination SL=2, the pixels are observed repeatedly in order of [A type], [A type]

and [B type], [B type]. In contrast, for example, in a case of the inclination SL=(3+0.5)/3, the pixels are observed repeatedly in order of [A type], [B type] and [A type], [B type], [A type] and [B type] . . . . In this way, a cycle of repetition is elongated, a pattern due to interference is difficult to be visually confirmed.

Further, in the first embodiment, the pixels in the display area configure a group constituted of three pixels arranged in the row direction, when a horizontal pitch of the structural bodies of the optical element with the number of pixels as a unit is represented by a symbol $LM_X$, an inclination of the structural bodies with the number of pixels as a unit is represented by a symbol SL, a vertical displacement between the vertical center position of a given color of a pixel group observed through a given structural body and a vertical center position of the given color of a pixel group observed through a structural body arranged with one structural body intervened with respect to the given structural body with the number of pixels as a unit is represented by a symbol OFS, and the number of pixel groups included in a horizontal width between a pixel observed through a given structural body and a pixel observed through a structural body arranged with one structural body intervened with respect to the given structural body is represented by a symbol NP, setting is performed so as to satisfy the following:

the symbol $LM_X$ is a non-integer, the symbol NP is an odd number, and $2 \cdot LM_X = 3 \cdot NP + (OFS/SL)$ is established.

Hereinafter, a description will be given in detail with reference to drawings.

Figure 8:
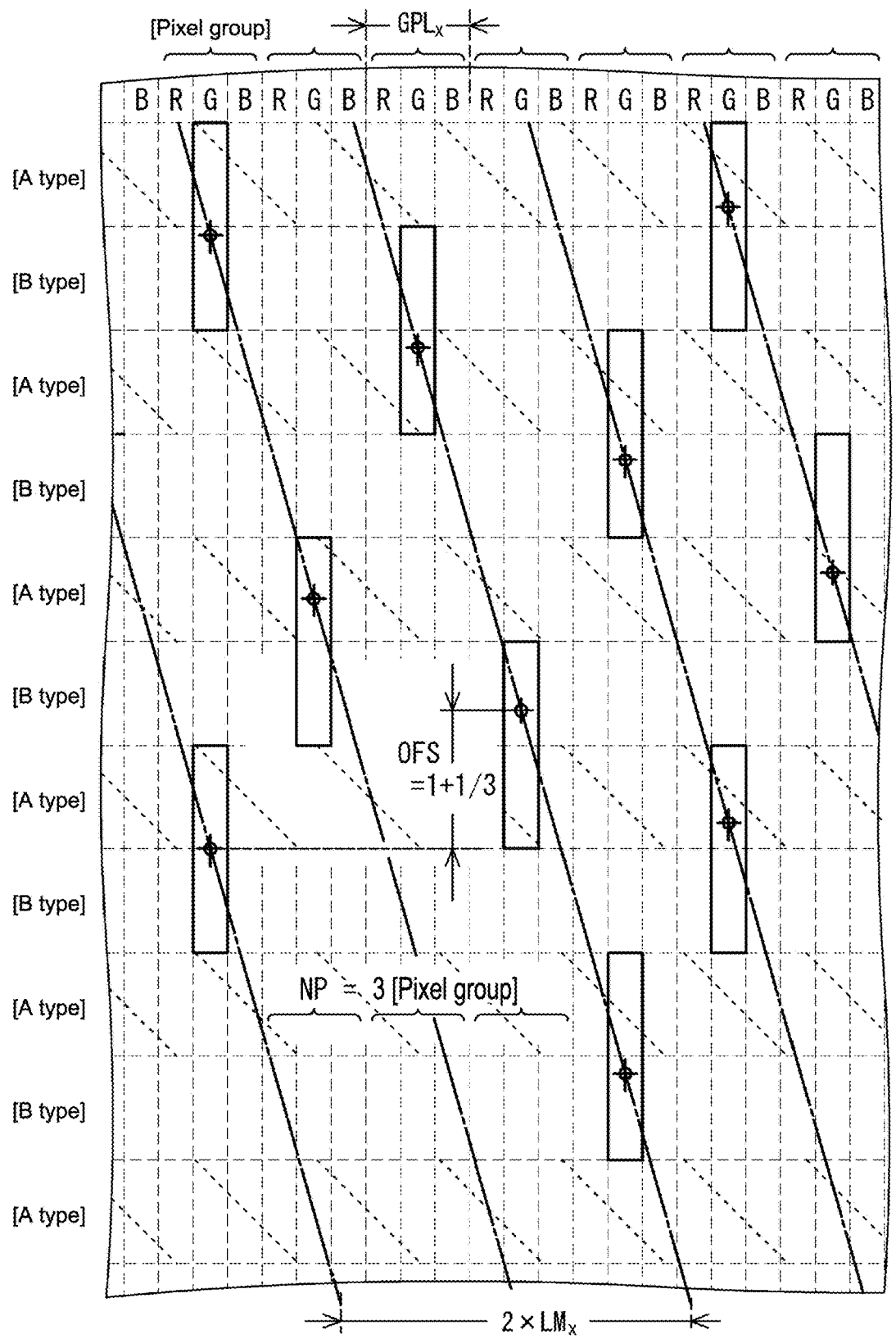
FIG. 8 A schematic plan view showing an example in a case where 2·LMX=3·NP+(OFS/SL) is established, where a symbol LMX is a non-integer and a symbol NP is an odd number.

FIG. 8 is a schematic plan view showing an example in which the symbol $LM_X$ is a non-integer, the symbol NP is an odd number, and $2 \cdot LM_X = 3 \cdot NP + (OFS/SL)$ is established. It should be noted that a relationship of $GPL_X = 3 \times PL_X$ is established.

In this example, the symbol NP=3, the symbol OFS=(1+1/3), and the SL=(3+0.5)/3 are established as an example. The pixels with a specific color (green in this case) observed from a certain point of view are each surrounded by a thick line, and further, a circle is put on a center of each pixel in the horizontal direction.

Here, a distribution of the centers of the pixels in the horizontal direction shown in FIG. 8 will be described.

Figure 9:
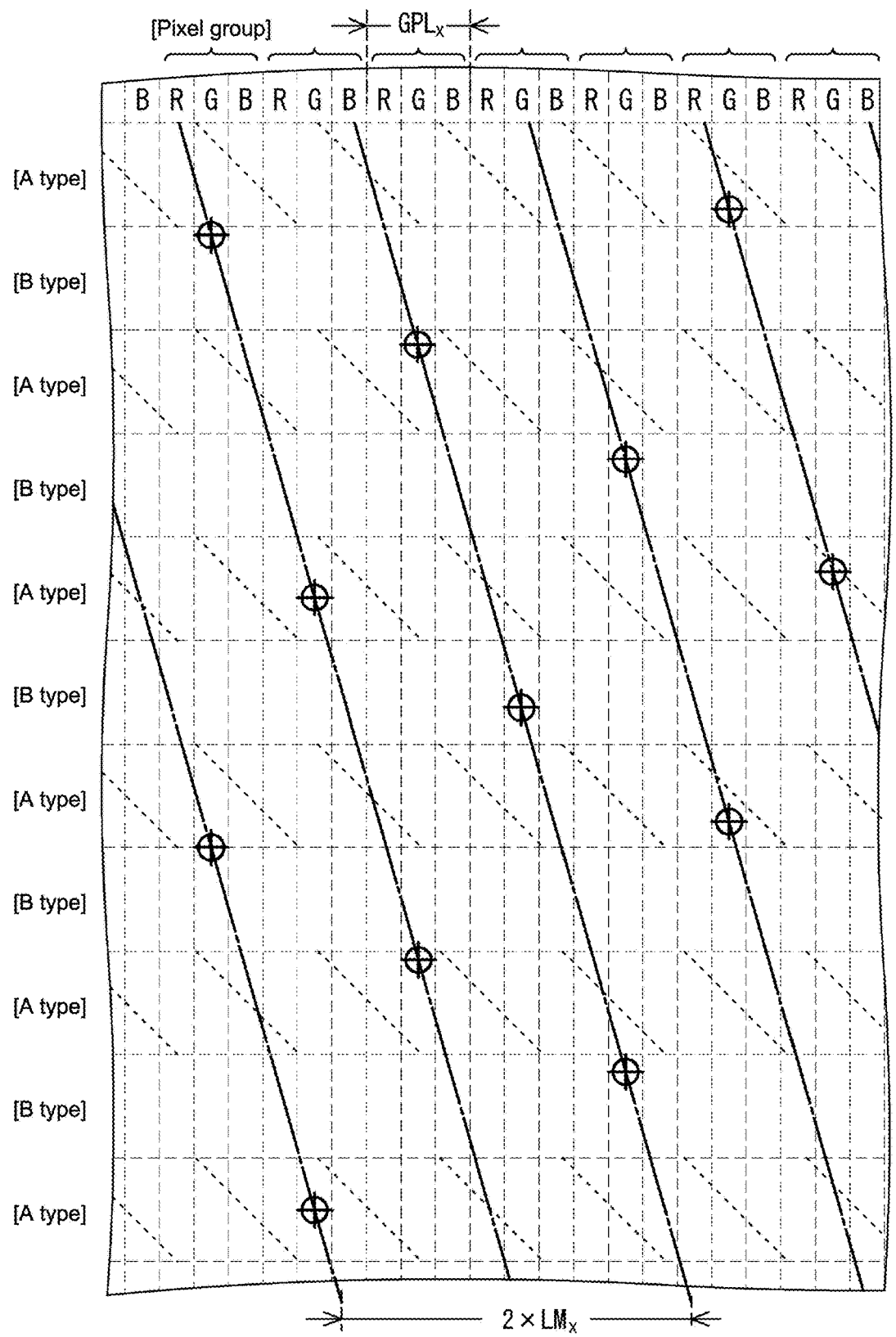
FIG. 9 A schematic plan view for explaining a vertical center position of a given color of a pixel group to be observed through a given structural body and a vertical center position of the given color of the pixel group to be observed through a structural body arranged with one structural body intervened with respect to the given structural body.

FIG. 9 a schematic plan view for explaining, in the state shown in FIG. 8, a vertical center position of a given color of a pixel group observed through a given structural body and a vertical center position of the given color of the pixel group observed through the structural body arranged with one structural body intervened with respect to the given structural body.

As shown in the figure, the centers of the given color of the pixel group observed through the structural body are distributed on a line extended along the structural bodies with a predetermined cycle. However, between adjacent structural bodies, the center is distributed with approximately half cycle shifted.

Here, to help understanding the present technology, a case where the symbol NP is an even number will be described.

Figure 10:
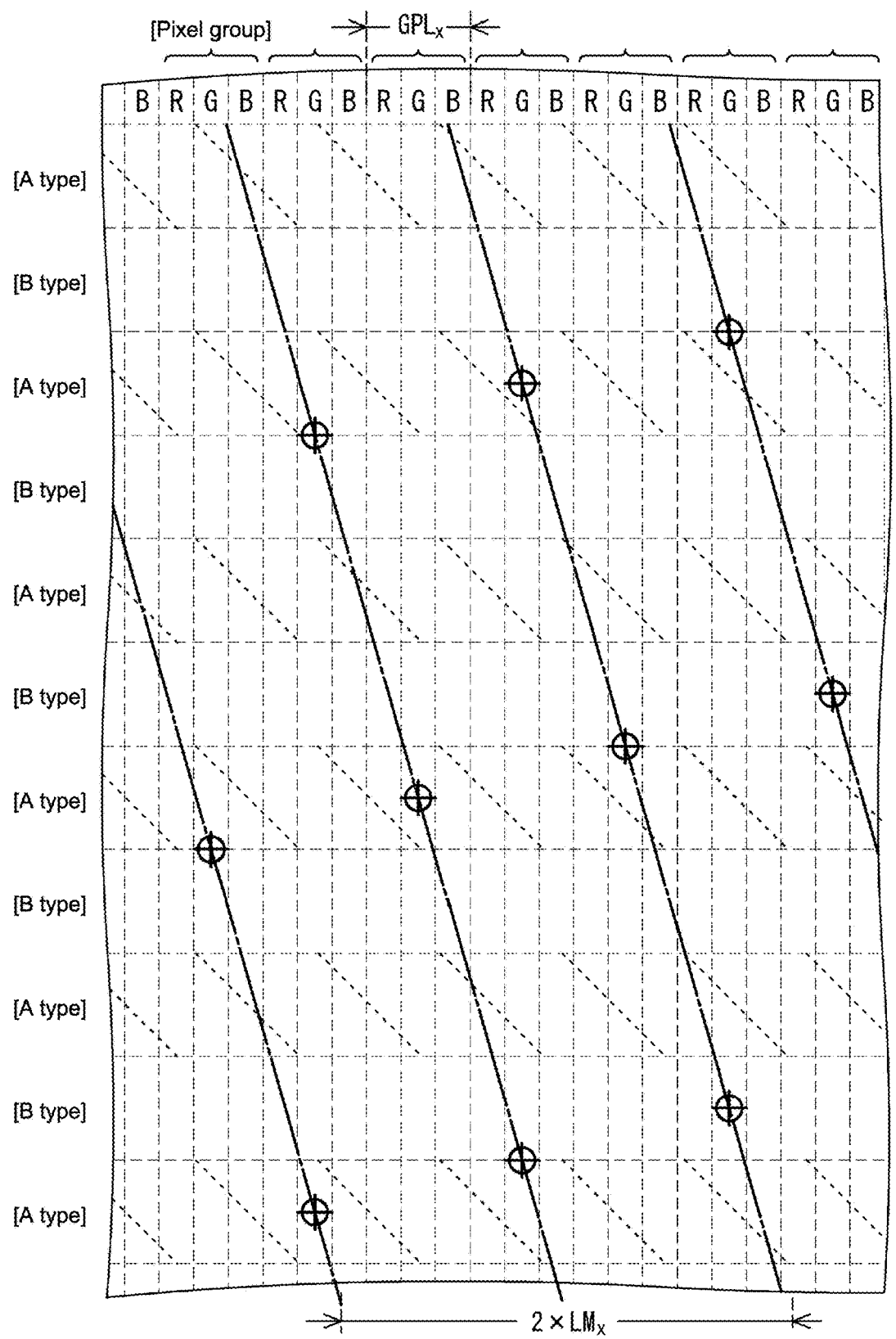
FIG. 10 A schematic plan view for explaining a vertical center position of a given color of a pixel group to be observed through a given structural body and a vertical center position of the given color of the pixel group to be observed through a structural body arranged with one structural body intervened with respect to the given structural body, in a case where 2·LMX=3·NP+(OFS/SL) is established, where the symbol LMX is the non-integer, and the symbol NP is an even number.

FIG. 10 is a schematic plan view for explaining a vertical center position of a given color of a pixel group observed through a given structural body and a vertical center position of the given color of the pixel group observed through structural body arranged with one structural body intervened with respect to the given structural body, in a case where the symbol $LM_X$ is a non-integer, the symbol NP is an even number, and $2 \cdot LM_X = 3 \cdot NP + (OFS/SL)$ is established.

Also in this case, the centers of the given color of the pixel group observed through the structural body are distributed on a line extended along the structural body at a predetermined cycle. However, a shift of the cycle between adjacent structural bodies is small.

Subsequently, a meaning that the symbol NP is set to an odd number will be described.

Figure 11B:
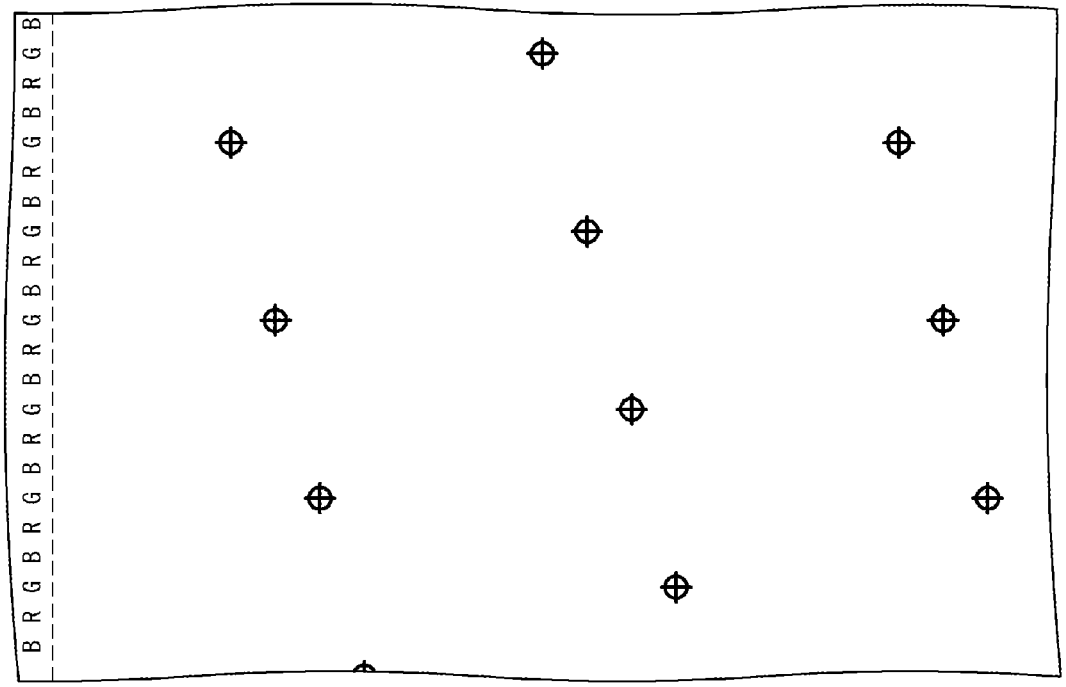
Figure 11A:
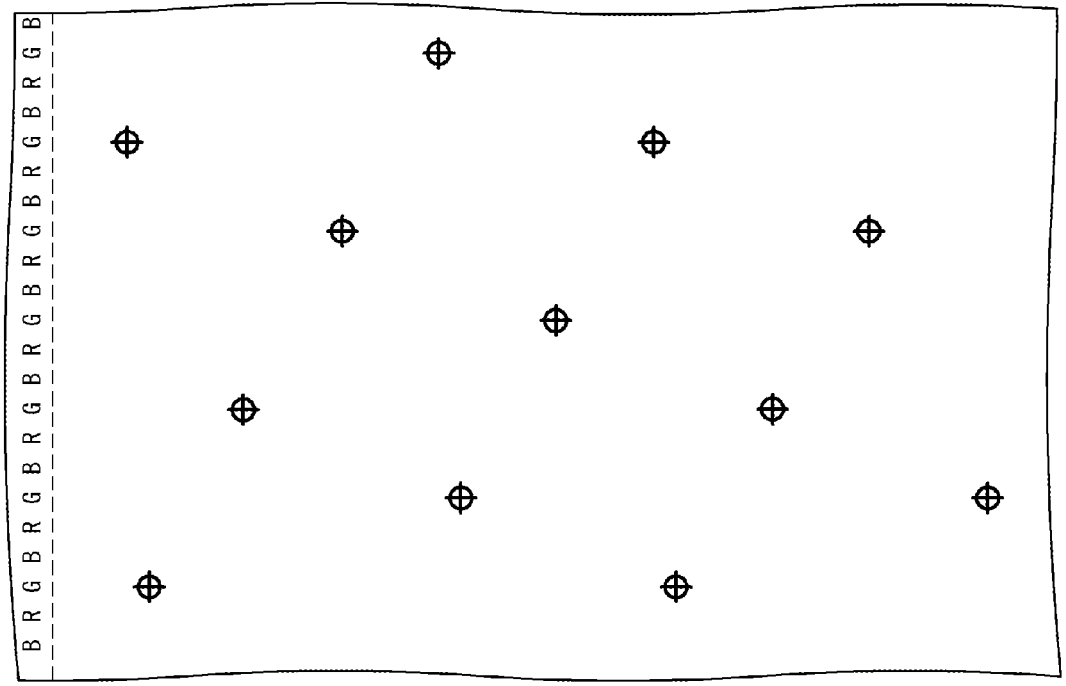

FIG. 11A and FIG. 11B are diagrams for explaining a difference between a case where the symbol NP is an odd number and a case where the symbol NP is an even number. FIG. 11A shows a state in which the center positions shown in FIG. 9 are extracted, and FIG. 11B shows a state in which the center positions shown in FIG. 10 are extracted.

As is clear from a comparison of the figures, in FIG. 11A in which the symbol NP is the odd number, a degree in which centers of the pixels are on lines is reduced as compared to the case of FIG. 11B in which the symbol NP are the even number. Accordingly, a degree of a stripe pattern based on a distribution of the centers of the pixels is also reduced.

Figure 12:
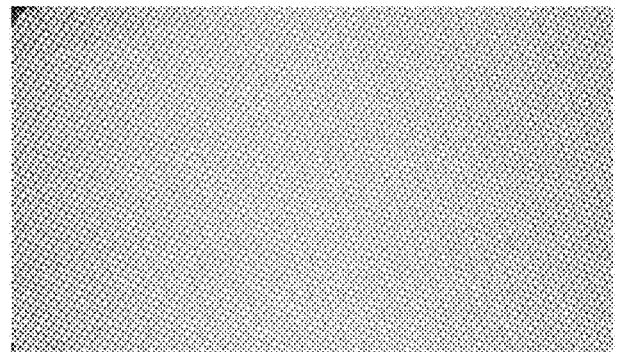
FIG. 12 A figure substitute picture for explaining moire in the first embodiment.
Figure 12:
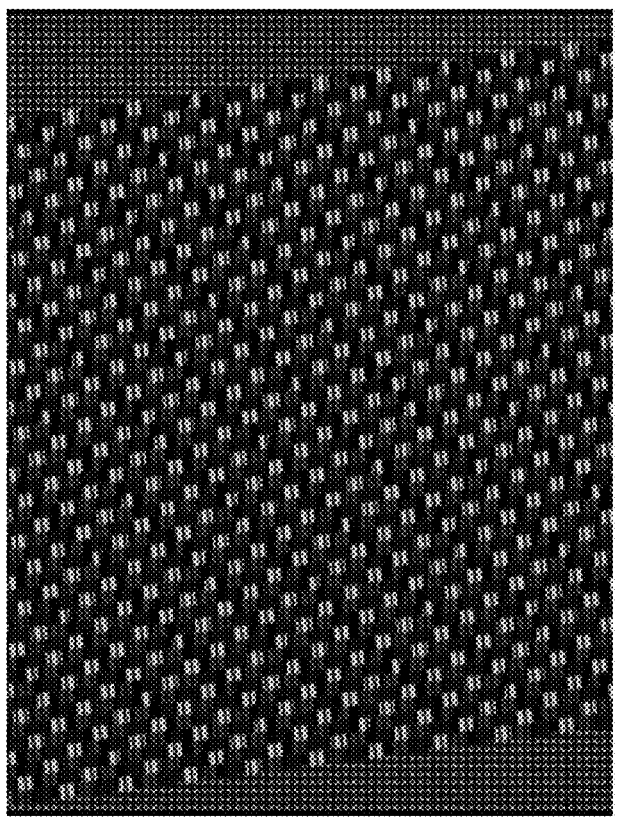

FIG. 12 is a figure substitute picture for explaining the moire in the first embodiment. A right side in FIG. 12 shows an image obtained by a simulation, and a left side in FIG. 12 shows a picture of an actual machine. As compared to FIG. 6, it is found that vertical stripes are reduced.

Subsequently, a structure of the optical element 30 will be described in detail with reference to the drawing.

Figure 13:
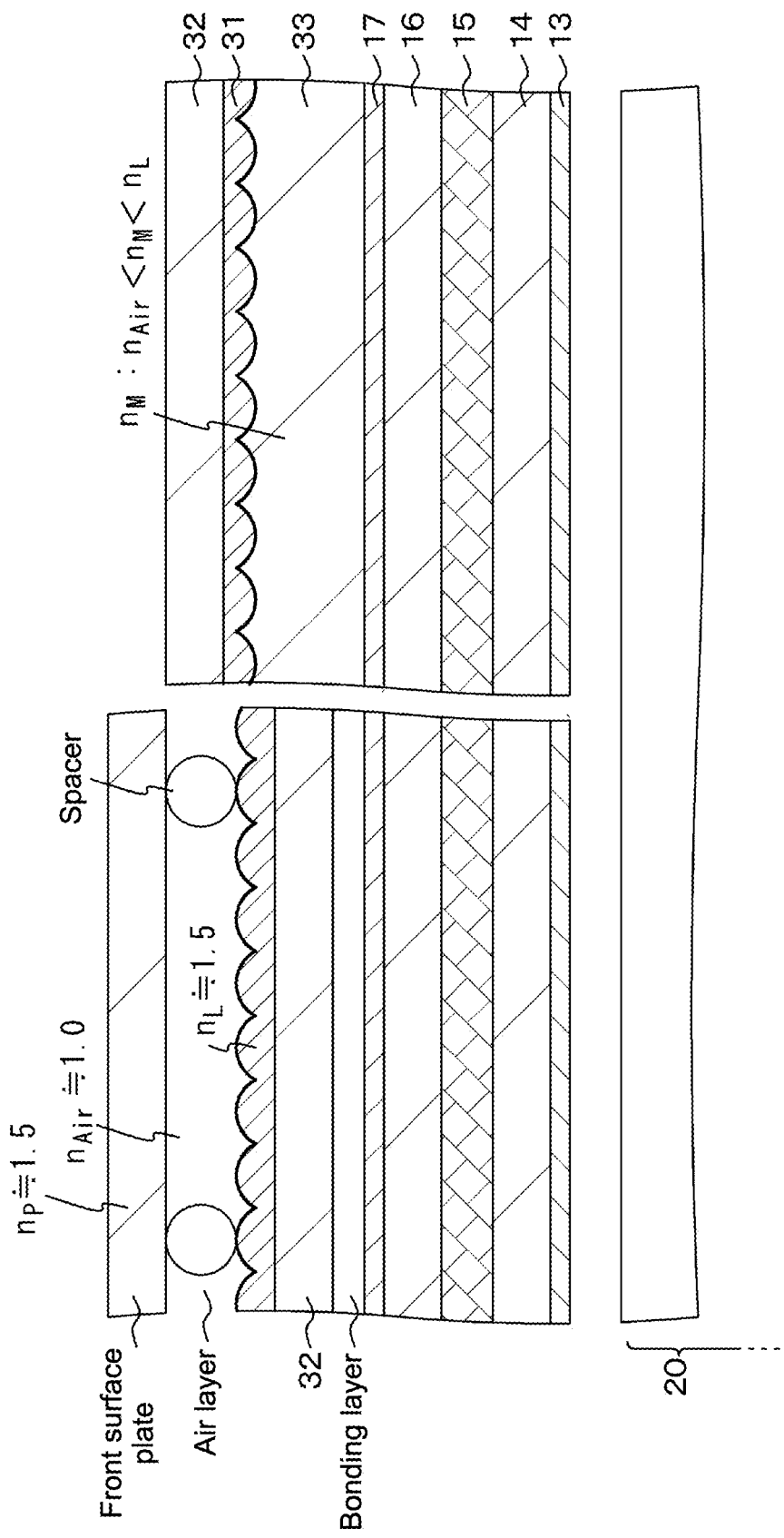
FIG. 13 A schematic cross-sectional view showing a part of the display apparatus for explaining a refractive index of a constituent of the optical element.

FIG. 13 is a schematic cross-sectional view of a part of the display apparatus for explaining a refractive index of a component of the optical element.

A left side in FIG. 13 shows a configuration of a reference example in which a front surface plate is disposed in front of the lenticular lens. The front surface plate faces a lenticular lens unit with a spacer intervened therebetween. The base material 32 is made of a transparent material such as soda glass and acrylic, and a refractive index thereof is approximately 1.5. The lenticular lens unit 31 is made of an ultraviolet curable resin material. The lenticular lens unit 31 has a refractive index $n_L \approx 1.5$. The base material 32 and the display unit 10 are bonded by a bonding layer.

The front surface plate is made of a transparent material such as soda glass and acrylic, and has a refractive index $n_F \approx 1.5$. A gap is an air layer having a refractive index $n_{Air} \approx 1.0$.

This configuration has problems in that reflection is caused due to an interface between the front surface plate and the air layer, a contrast is lowered, an overlapped image is observed, for example.

A right side in FIG. 13 shows the configuration of the first embodiment. A gap between the lenticular lens unit 31 and a flat plate which faces the lenticular lens unit 31 (liquid crystal display panel that constitutes the display unit 10 in this case) is filled with the resin layer 33 having a refractive index different from that of the material that constitutes the lenticular lens unit 31. A refractive index $n_M$ of the resin layer 33 is set to have a relationship of $n_{Air} < n_M < n_L$.

More specifically, the resin layer 33 is made of an ultraviolet curable resin material containing fluorinated resin as a main material having a film thickness of approximately 90 μm and $n_M = 1.32$.

This setting reduces the reflection caused by the interface and improves the contrast of the image as compared to the case of the left side in FIG. 13. A measurement performed by using MC-2500 (manufactured by KONIKA MINOLTA, INC.) was performed, and a result of the measurement shows that a reflection rate was 5.4% in the reference example and 2.2% in the configuration of the first embodiment.

In the configuration of the first embodiment, a difference of the refractive indexes on an interface of the lenticular lens unit is small, so a curvature of the lens has to be increased. However, just increasing the curvature leads to an increase in aberration.

Figure 14:
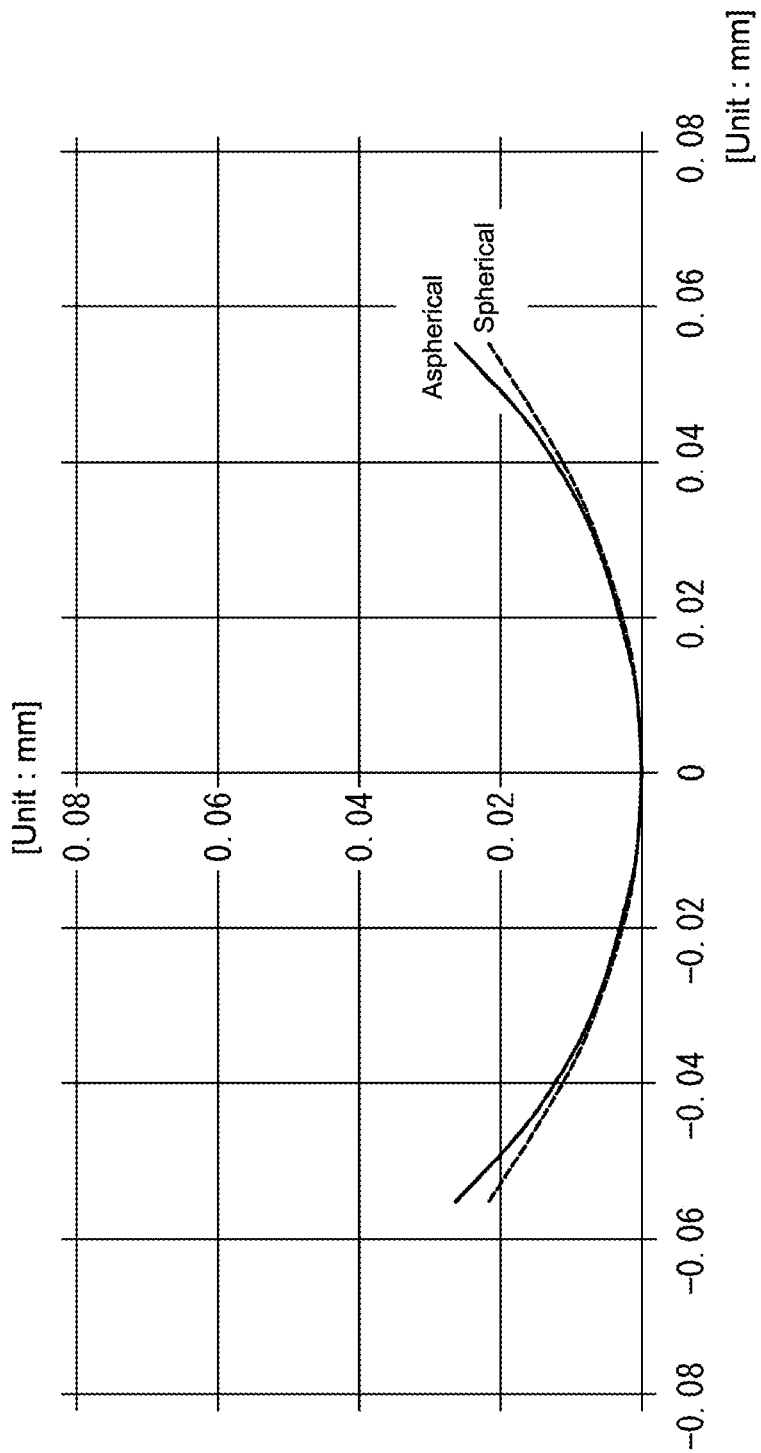
FIG. 14 A schematic graph for explaining a shape at a time when a lens sequence that constitutes the structural body is disconnected with a plane, a normal direction of which is a direction in which the lens sequence is extended.

In view of this, in the first embodiment, an aspherical shape is used to reduce the aberration. FIG. 14 is a schematic graph for explaining a shape at a time when a lens sequence that constitutes the structural body is cut by a plane, a normal direction of which corresponds to a direction in which the lens sequence is extended. A solid line indicates the aspherical shape used in this case, and a broken line indicates a reference shape of a spherical surface.

Subsequently, a hardness of the resin layer 33 will be described.

As the hardness of the resin layer 33 is increased, a stress applied to the display unit 10 tends to be increased. As a result, around the display unit 10, brightness unevenness is caused.

Figure 15:
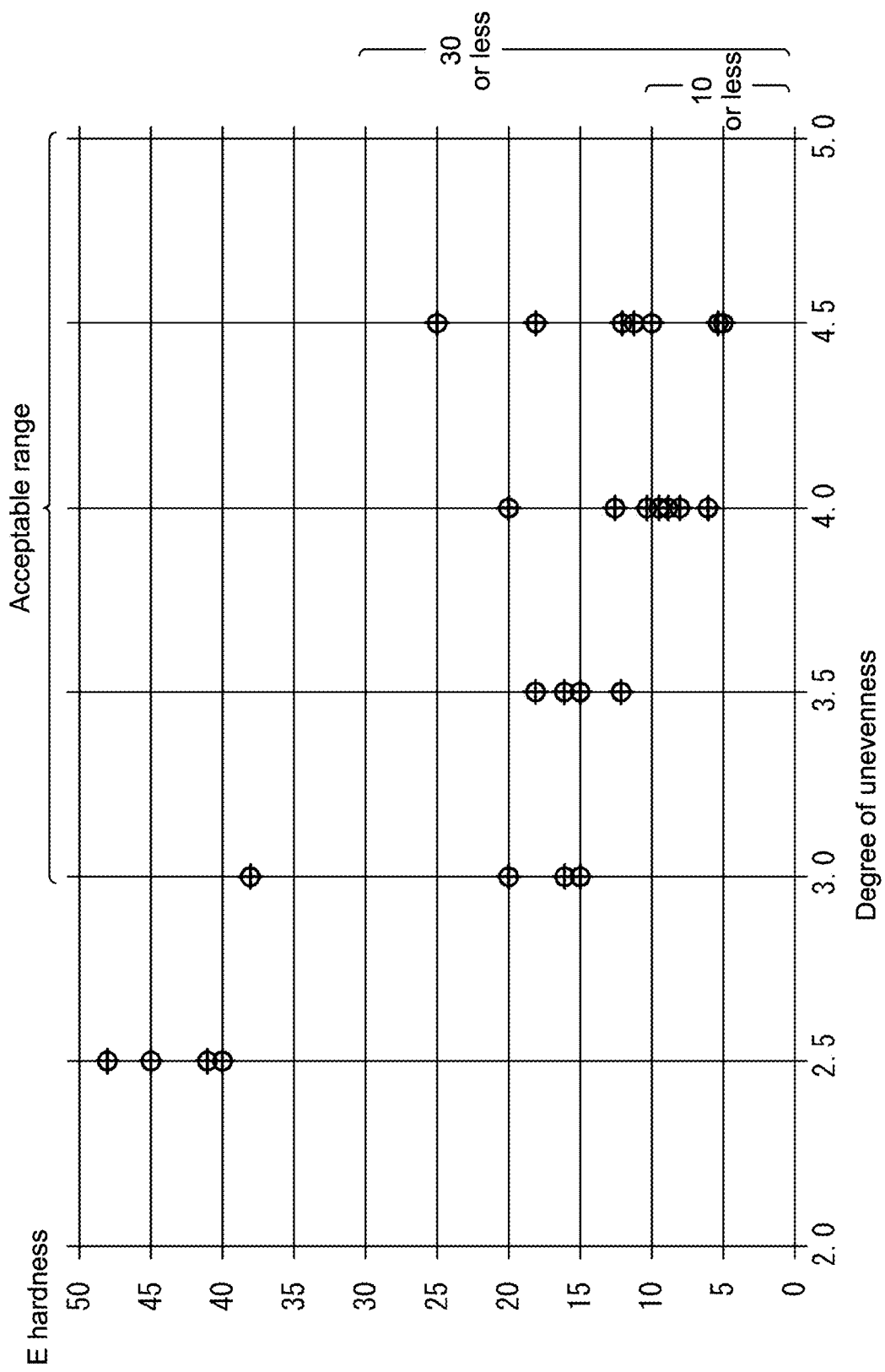
FIG. 15 A schematic graph for explaining a relationship between an E hardness of a resin layer and a degree of unevenness.

The hardness of the resin layer 33 is changed, and the brightness unevenness is evaluated on a ten-point scale with five points as full points. It should be noted that a film thickness of the resin layer 33 was set to substantially 90 µm. A result thereof is shown in FIG. 15.

In a case of an evaluation of 3.0 or more in a sensory evaluation, the brightness unevenness is within an acceptable range. From the result, in a case where an E hardness is 30 or less, more desirably, the E hardness is 10 or less, the brightness unevenness was good. It should be noted that the E hardness was measured by using Type E durometer. From a similar viewpoint, it is desirable that an elastic modulus of the resin layer 33 be equal to or less than 500 kPa.

Figure 16:
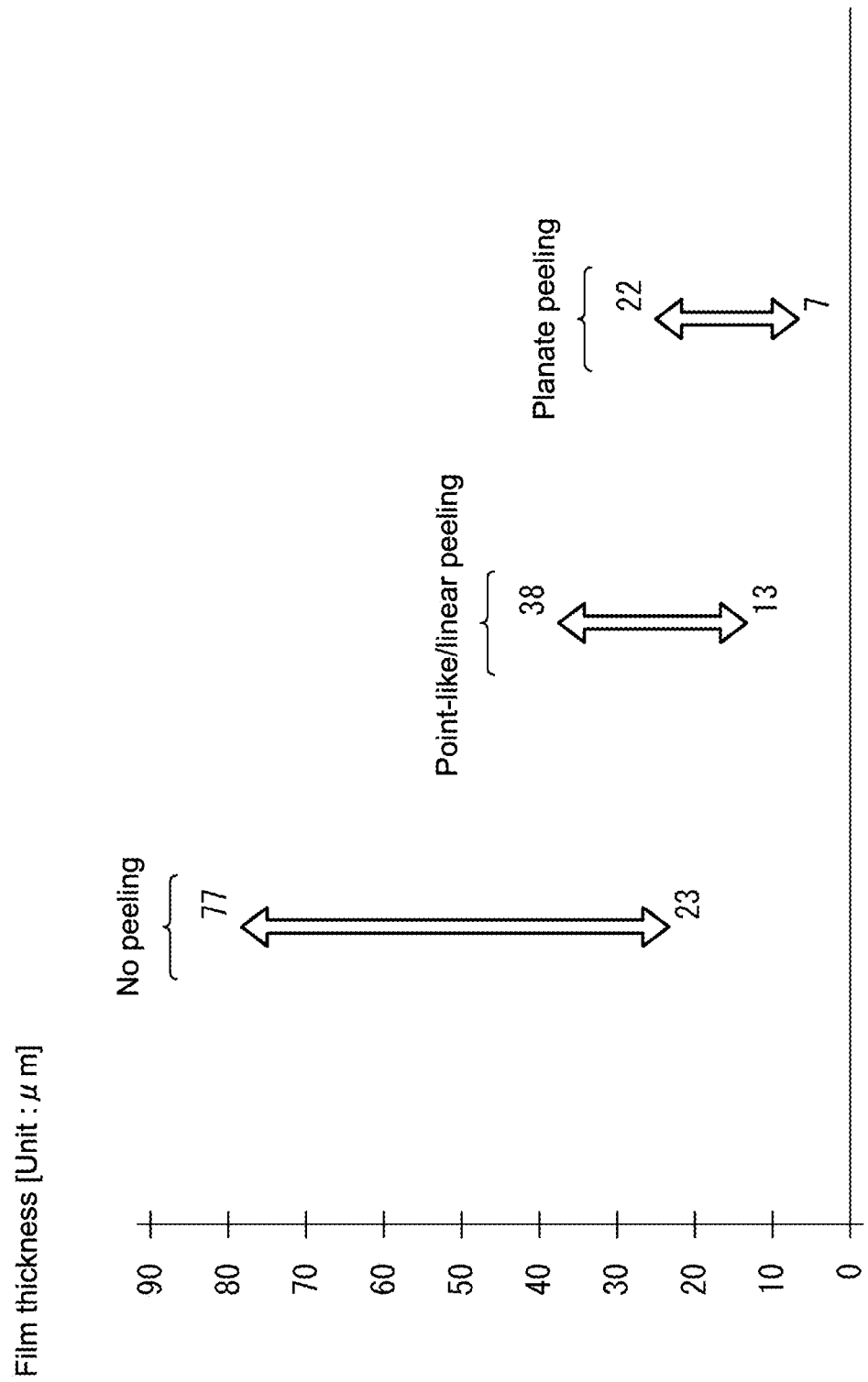
FIG. 16 A schematic graph for explaining a thickness of a resin layer and a peeling degree.

Further, from a viewpoint of a bonding strength, it is desirable that the film thickness of the resin layer 33 be equal to or more than a certain degree. The film thickness was changed to evaluate peeling. A result thereof is shown in FIG. 16.

100 kinds of samples having different film thicknesses were prepared, and peeling thereof was evaluated. As a result, peeling was not recognized in a case where the film thickness is equal to or more than 40 µm. Therefore, it is desirable that the film thickness of the resin layer 33 be equal to or more than 40 µm.

Subsequently, with reference to FIGS. 17A, 17B, 17C, 18A, 18B, 18C, and 19, methods of manufacturing the optical element 30 and the like will be described.

Figure 17A:
FIGS. 17A, 17B, and 17C are schematic diagrams for explaining a method for manufacturing the optical element and the like used in the first embodiment.
Figure 17B:
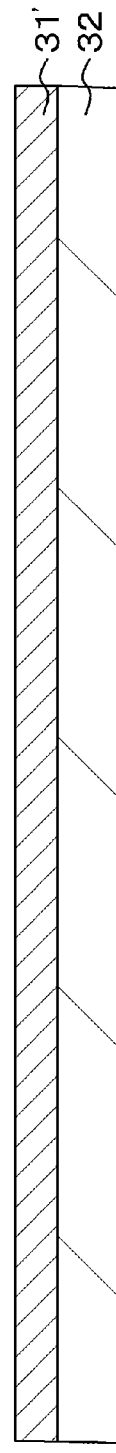
Figure 17C:
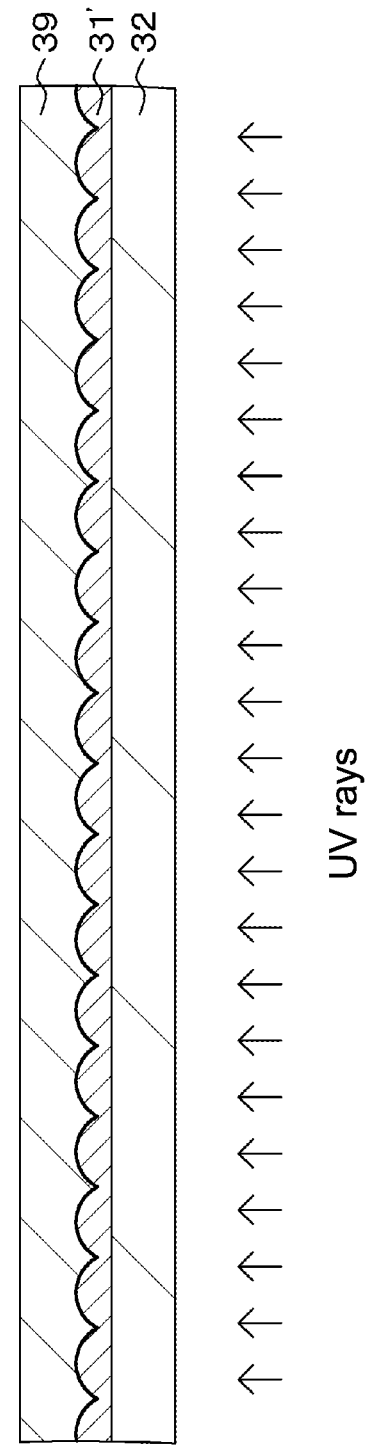
Figure 18A:
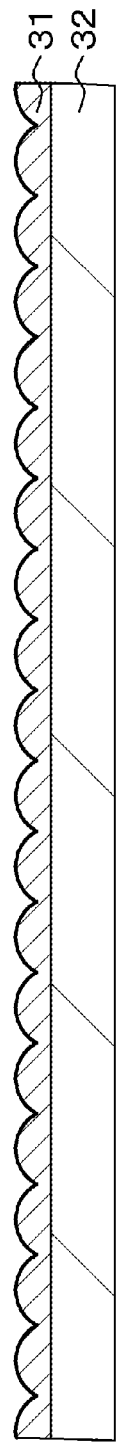
FIG. 18A and FIG. 18B are schematic diagrams for explaining, following FIG. 17C, a method for manufacturing the optical element and the like used in the first embodiment.
Figure 18B:
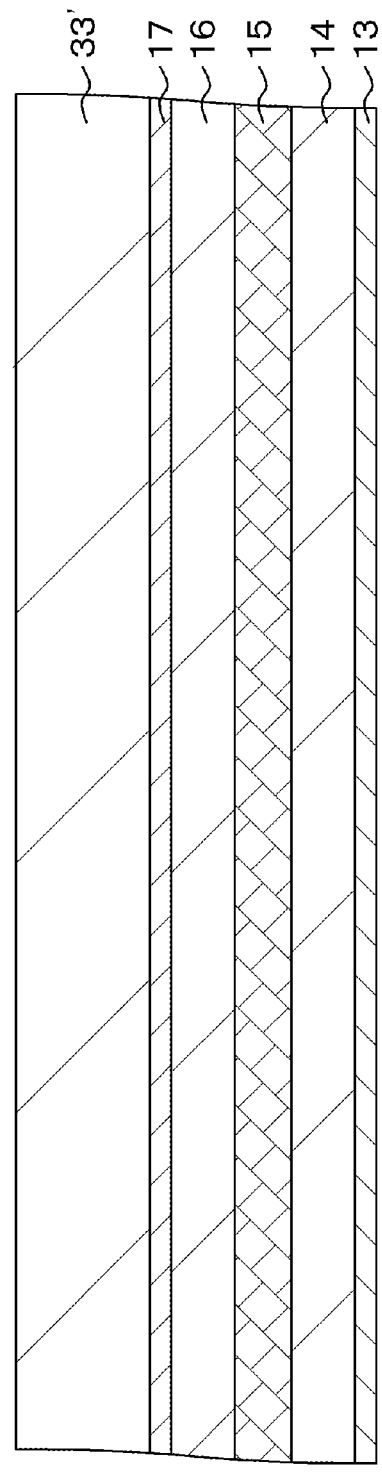

FIGS. 17A, 17B, and 17C are schematic diagrams for explaining a method of manufacturing the optical element and the like used in the first embodiment. FIG. 18A and FIG. 18B are schematic diagrams for explaining the method of manufacturing the optical element and the like used in the first embodiment, following FIG. 17C.

First, the base material 32 made of a transparent material is prepared (FIG. 17A), and on a surface thereof, an ultraviolet curable resin material is applied by using a known application method, and then a material layer 31' is formed (FIG. 17B). After that, on the material layer 31', a lens shaping mask 39 is disposed, ultraviolet rays are irradiated from the base material 32 side (FIG. 17C).

After that, the mask 39 is removed, and thus the lenticular lens unit 31 is formed on the base material 32 (FIG. 18A).

Subsequently, on the display unit 10, an ultraviolet curable resin material as a source of the resin layer 33 is applied by using a known application method, and thus, a material layer 33' is formed (FIG. 18B).

Figure 19:
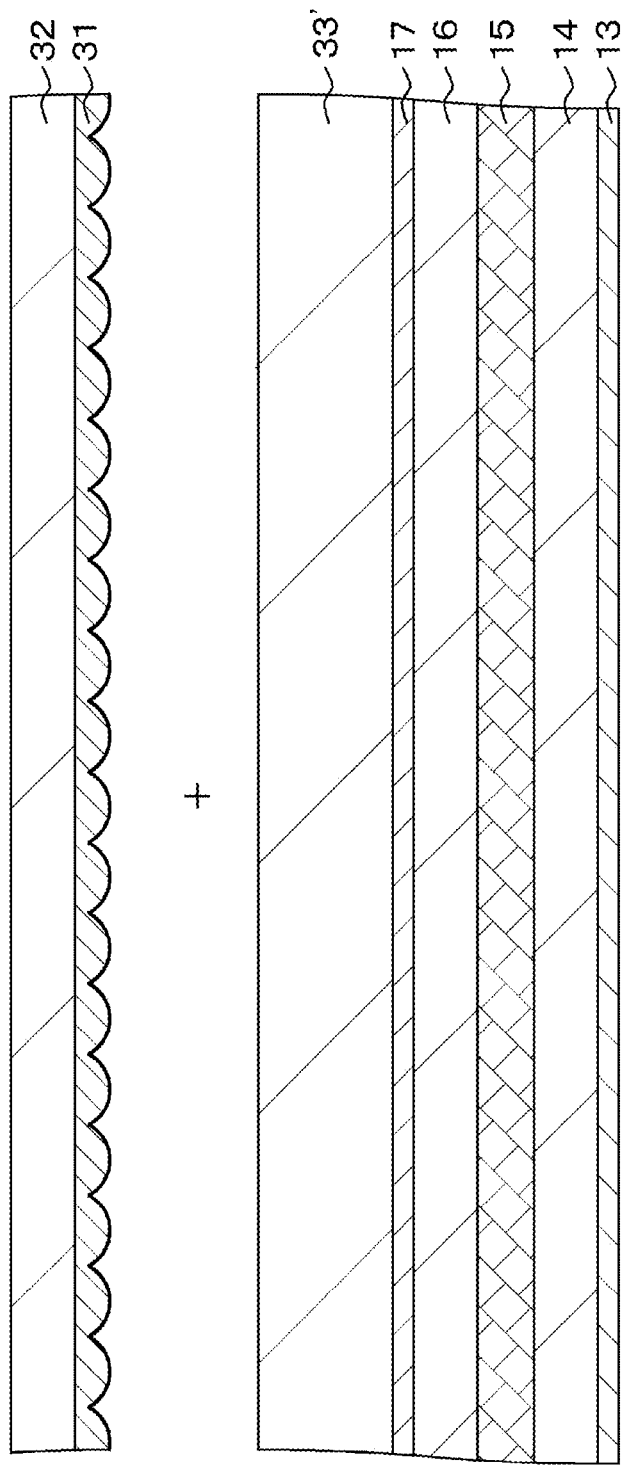
FIG. 19 A schematic diagram for explaining, following FIG. 18B, a method for manufacturing the optical element and the like used in the first embodiment.

After that, the material layer 33' and the lenticular lens unit 31 are superposed so as to face each other (FIG. 19). After that, by irradiating ultraviolet rays, the material layer 33' is cured, and thus the resin layer 33 is formed.

Subsequently, a first modified example of the first embodiment will be described.

Figure 20:
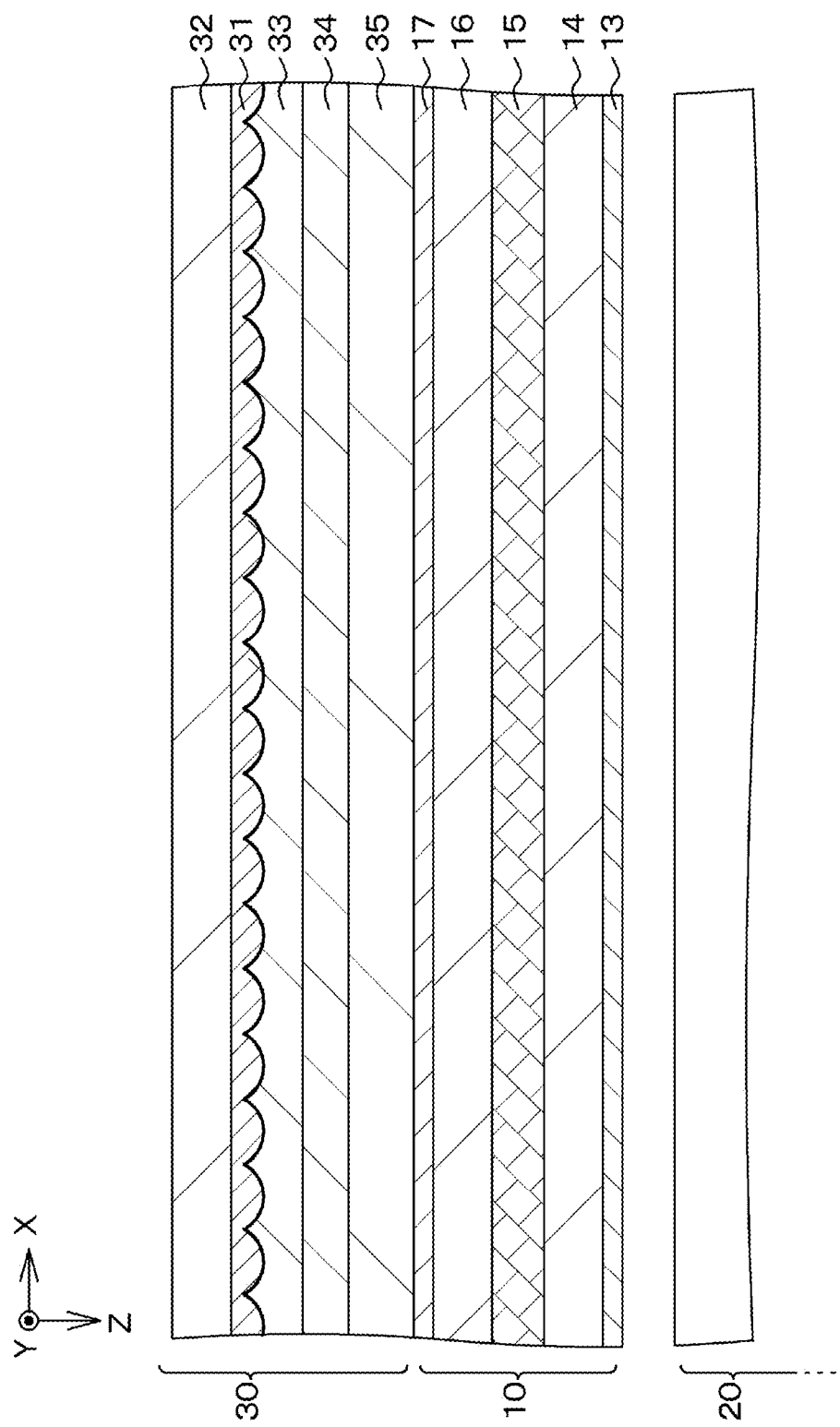
FIG. 20 A schematic cross-sectional view showing a part of a display apparatus in a first modified example of the first embodiment.

FIG. 20 is a schematic cross-sectional view showing a part of the display apparatus in the first modified example of the first embodiment.

In the first modified example, a laminated body constituted of the base material 32, the lenticular lens unit 31, the material layer 33, and a film 34 is formed first, and the laminated body and the display unit 10 are bonded with a bonding layer 35.

Subsequently, with reference to FIGS. 21A, 21B, 21C, and 22, the method of manufacturing the optical element 30 and the like will be described.

Figure 21A:
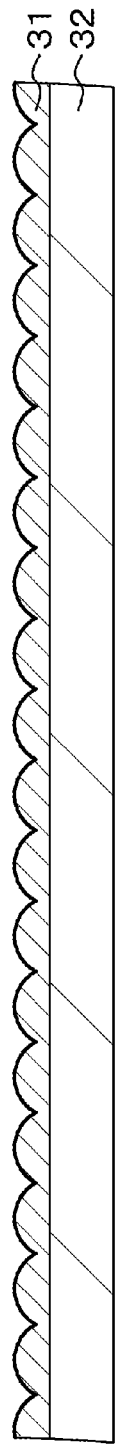
FIGS. 21A, 21B, and 21C are schematic diagrams for explaining a method for manufacturing an optical element used in the first modified example of the first embodiment.
Figure 21B:
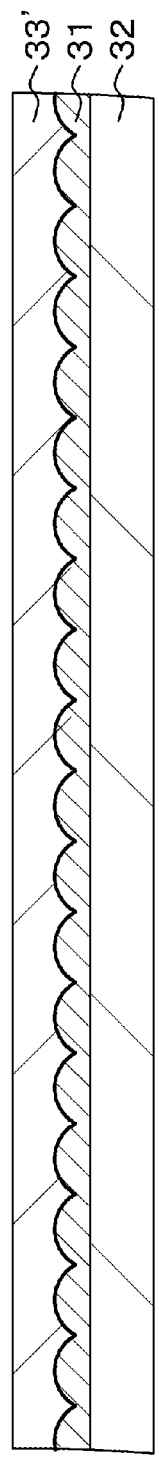
Figure 21C:
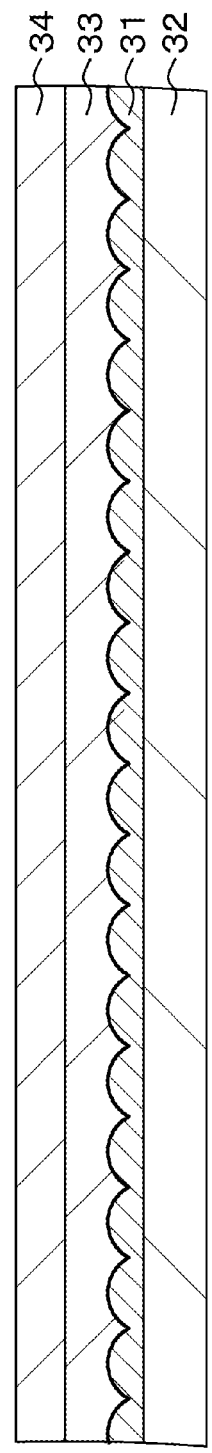
Figure 22:
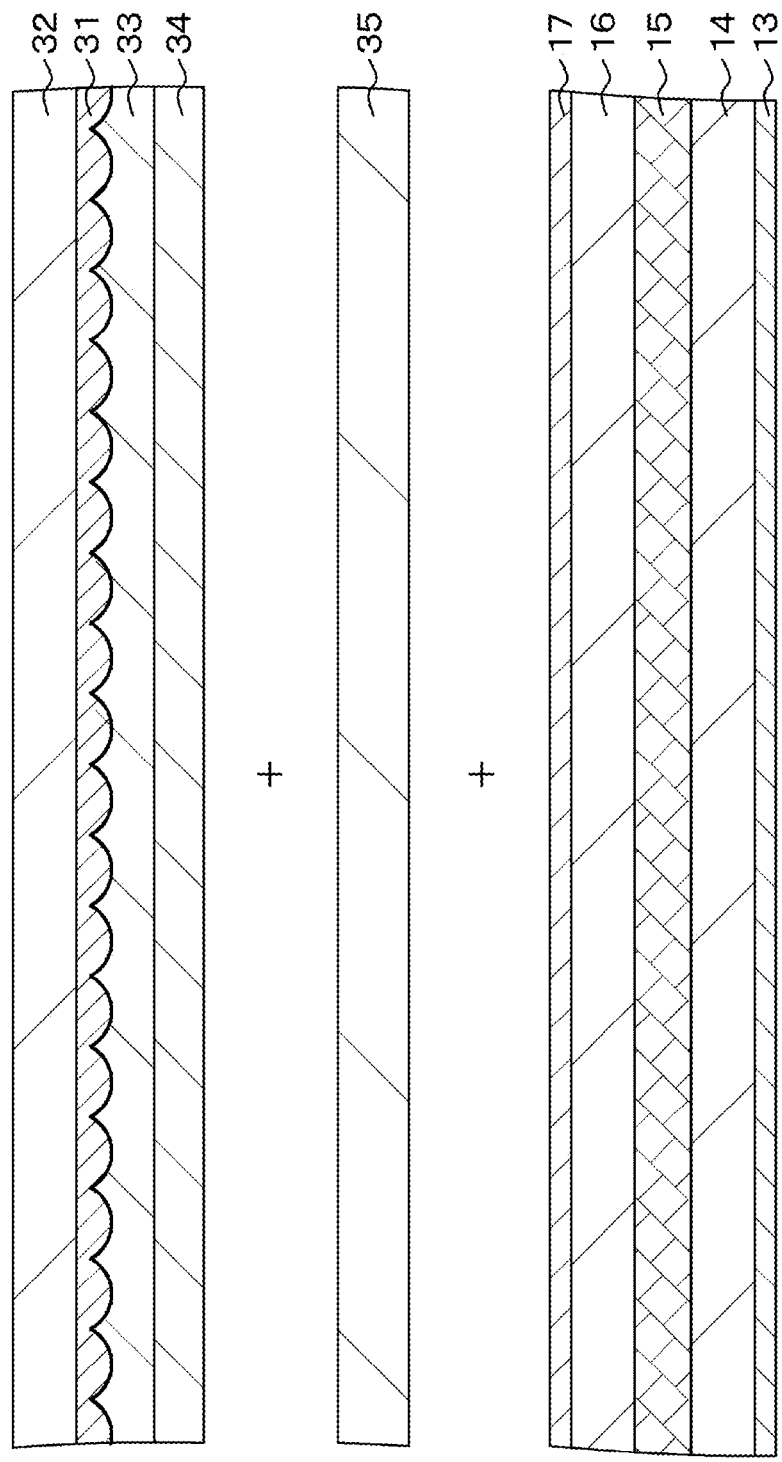
FIG. 22 A schematic diagram for explaining, following FIG. 21C, a method for manufacturing an optical element used in the first modified example of the first embodiment.

In a similar way to the case described with reference to FIGS. 17A, 17B, 17C, 18A, 18B, and 18C, on the base material 32, the lenticular lens unit 31 is formed (FIG. 21A). Subsequently, on the lenticular lens unit 31, an ultraviolet curable resin material as a source of the resin layer 33 is applied by a known application method, and thus the material layer 33' is formed (FIG. 21B). After that, for example, the film 34 made of PET is superposed, ultraviolet rays are irradiated, and thus a laminated body is formed (FIG. 21C). The laminated body thus obtained and the display unit 10 are bonded with the bonding layer 35 (FIG. 22).

Subsequently, a second modified example of the first embodiment will be described.

Figure 23:
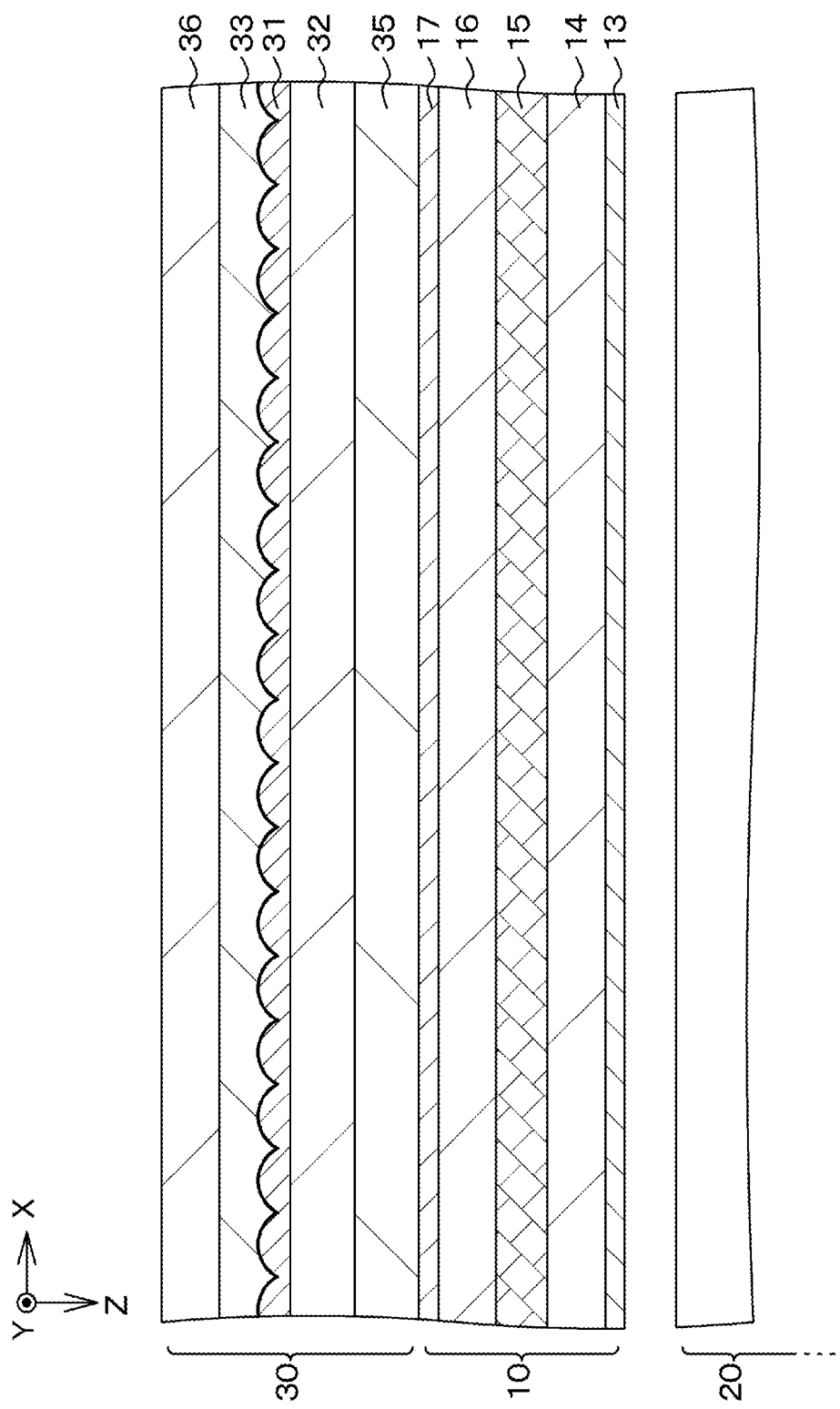
FIG. 23 A schematic cross-sectional view showing a part of a display apparatus in a second modified example of the first embodiment.

FIG. 23 is a schematic cross-sectional view showing a part of the display apparatus in the second modified example of the first embodiment.

In the second modified example, a configuration is provided in which the base material 32 and the display unit 10 are bonded with the bonding layer 35.

Subsequently, with reference to FIGS. 24A, 24B, 24C, and 25, the method of manufacturing the optical element 30 and the like will be described.

Figure 24A:
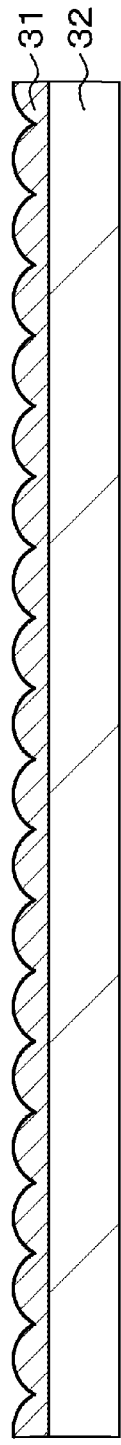
FIGS. 24A, 24B, and 24C are schematic diagrams for explaining a method for manufacturing an optical element and the like used in the second modified example of the first embodiment.
Figure 24B:
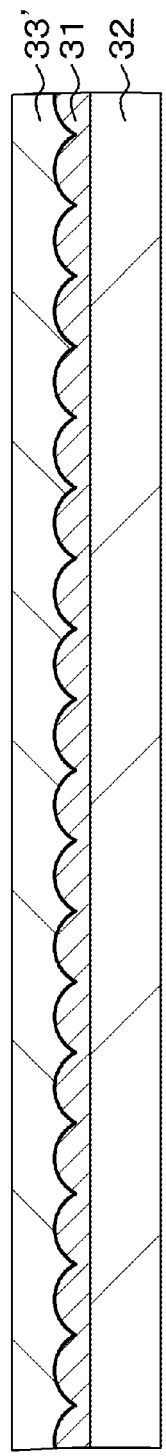
Figure 24C:
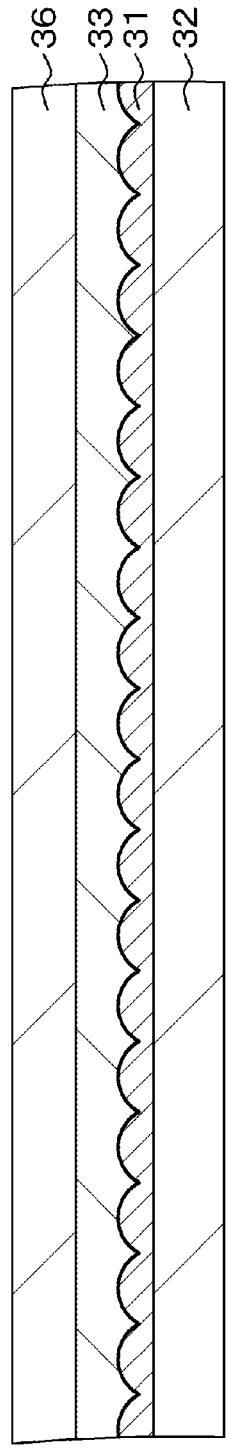
Figure 25:
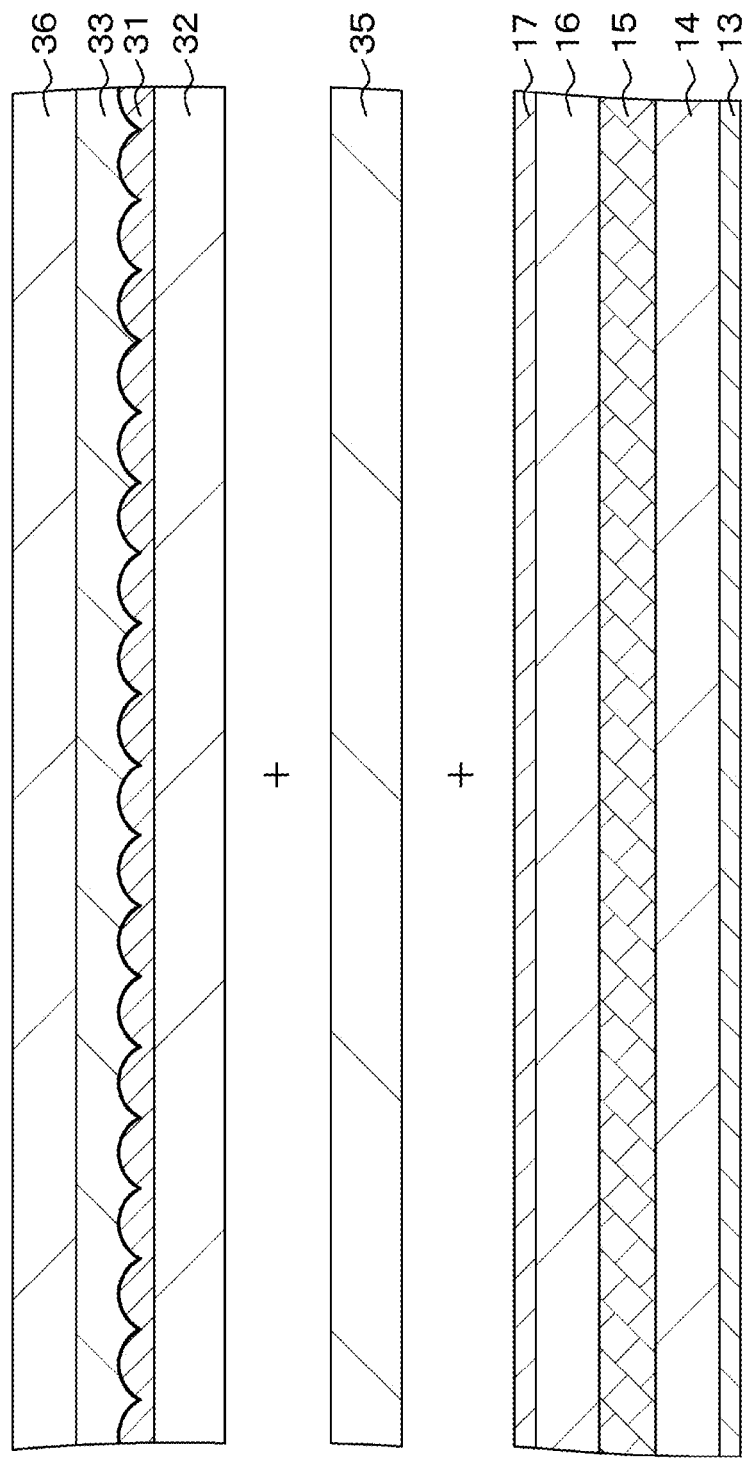
FIG. 25 A schematic diagram for explaining, following FIG. 24C, a method for manufacturing an optical element and the like used in the second modified example of the first embodiment.

In a similar way to the case described with reference to FIGS. 17A, 17B, 17C, 18A, 18B, and 18C, on the base material 32, the lenticular lens unit 31 is formed (FIG. 24A). Subsequently, on the lenticular lens unit 31, an ultraviolet curable resin material as a source of the resin layer 33 is applied by a known application method, and the material layer 33' is formed (FIG. 24B). After that, for example, a front surface plate 36 made of a glass material is superposed, ultraviolet rays are irradiated, and thus a laminated body is formed (FIG. 24C). The laminated body thus obtained and the display unit 10 are bonded with the bonding layer 35 (FIG. 25).

Figure 26:
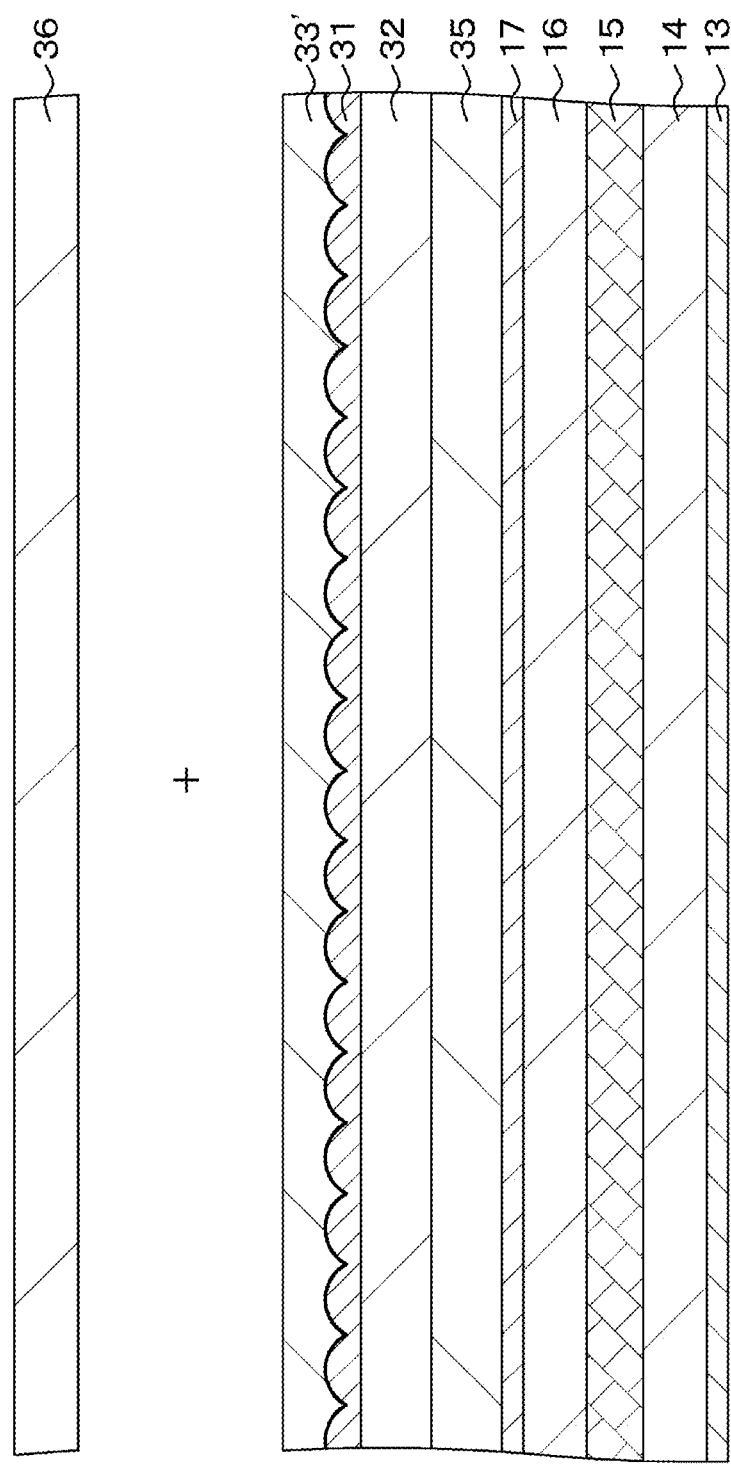
FIG. 26 A schematic diagram for explaining another method for manufacturing the optical element and the like used in the second modified example of the first embodiment.

It should be noted that the following configuration may be provided. The lenticular lens shown in FIG. 24A and the display unit 10 are bonded with the bonding layer 35, then the material layer 33' is formed on the lenticular lens unit 31, subsequently, the front surface plate 36 made of a glass material, for example, is superposed, and the ultraviolet rays are irradiated (FIG. 26).

Subsequently, a third modified example of the first embodiment will be described.

Figure 27:
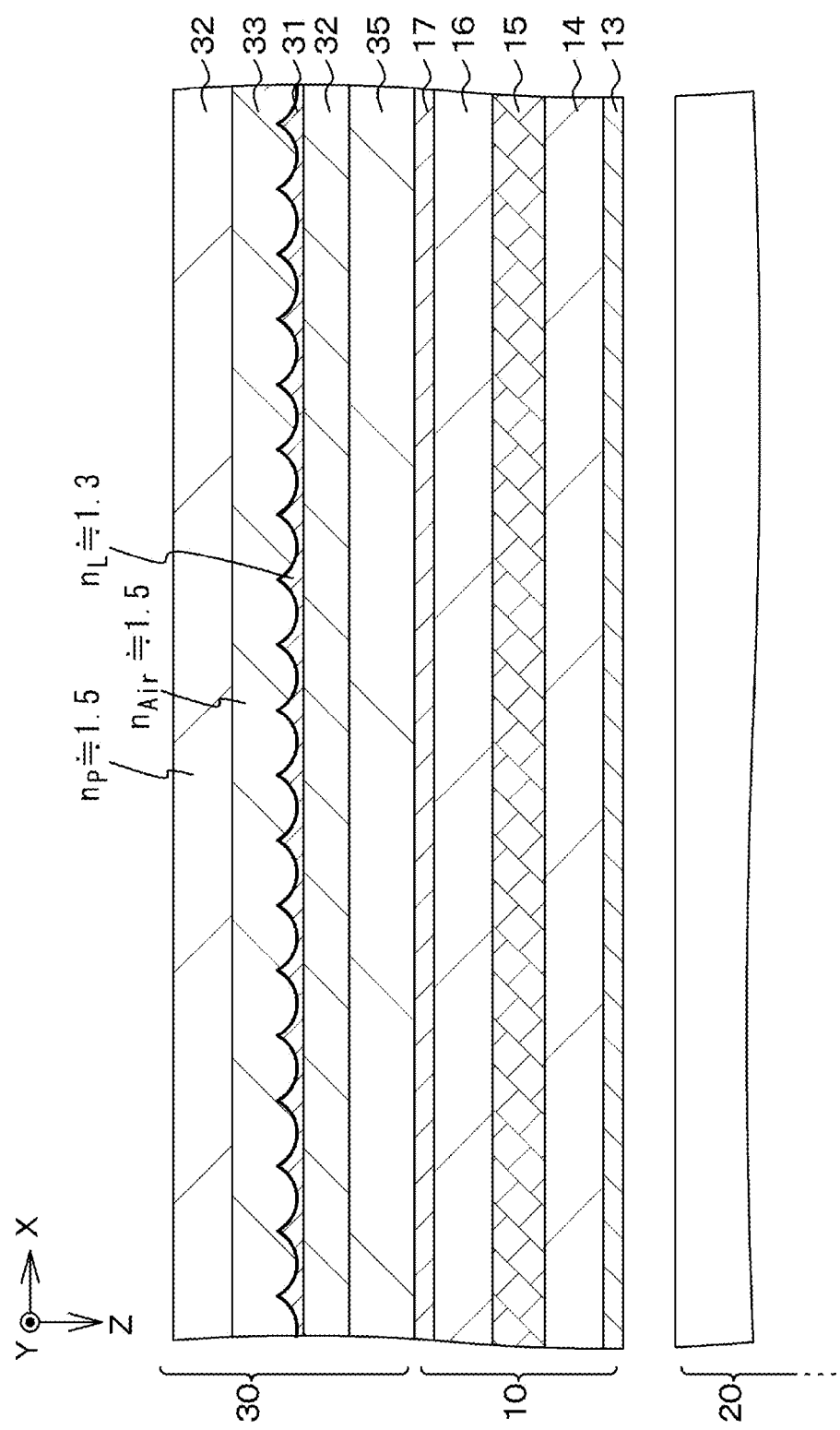
FIG. 27 The schematic cross-sectional view showing a part of a display apparatus in a third modified example of the first embodiment.

FIG. 27 is a schematic cross-sectional view showing a part of the display apparatus in the third modified example of the first embodiment.

In this modified example, a lens that constitutes the structural body 31 has a concave lens shape. To secure a lens characteristic, the resin layer 33 is made of a resin material having a refractive index higher than the material that constitutes the structural bodies 31. For example, it is desirable that the structural bodies 31 have a refractive index $n_L \approx 1.3$, and the resin layer 33 have the refractive index $n_M \approx 1.6$ to 1.8.

[Application Examples (Examples of Electronic Apparatus)]

Application examples of the display apparatus described above to an electronic apparatus will be described. As the electronic apparatus, an electronic apparatus for displaying a video signal input from outside or a video signal generated inside thereof as an image or a video can be cited.

Application Example 1

Figure 28A:
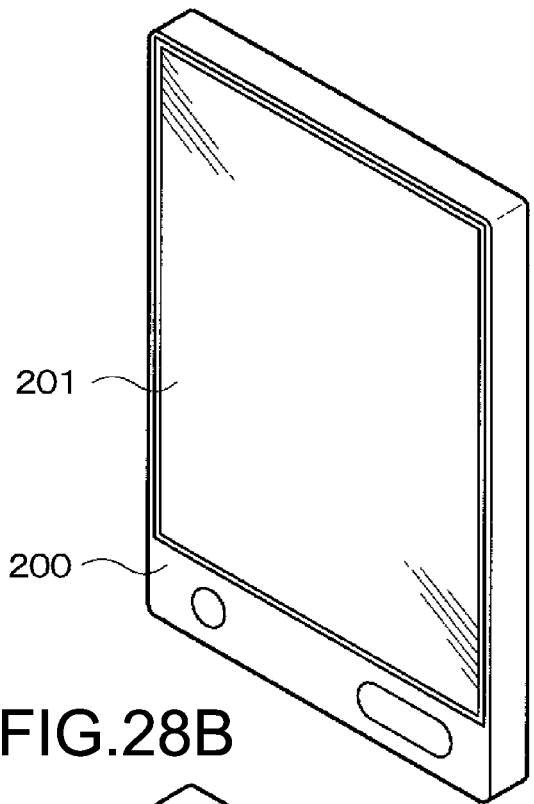
FIG. 28A and FIG. 28B are views each showing an external view of a smart phone to which the display apparatus in the embodiment is applied.
Figure 28B:
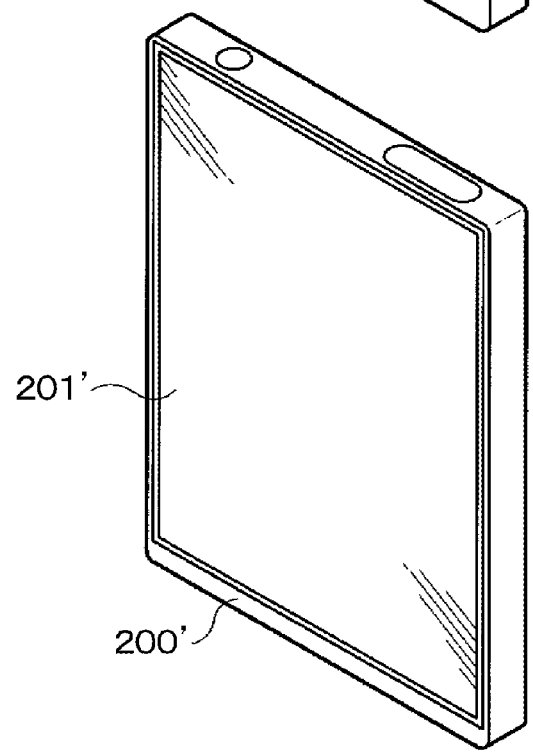

FIG. 28A and FIG. 28B each show an external view of a smart phone to which the display apparatus according to the embodiment is applied. Smart phones 200, 200' includes video display screen units 201, 201', for example. The video display screen units 200, 201' are each configured by the display apparatus according to the embodiment described above. By applying the display apparatus according to the embodiment described above, it is possible to display a stereoscopic image with less crosstalk, which can contribute to an enhancement of quality of the smart phones 200, 201'.

Application Example 2

Figure 29:
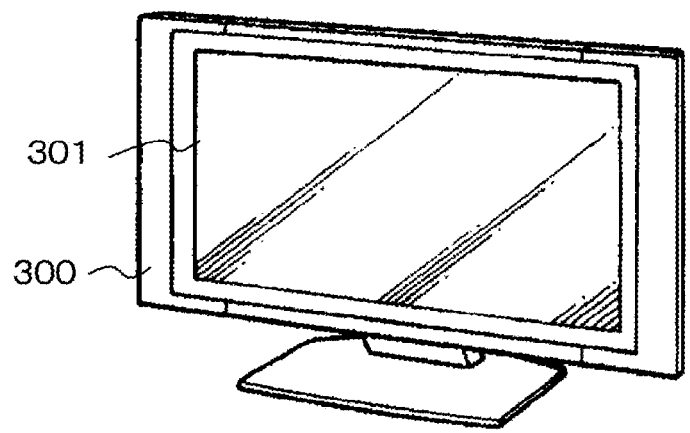
FIG. 29 A view showing an external view of a television set to which the display apparatus in the embodiment is applied.
Figure 30B:
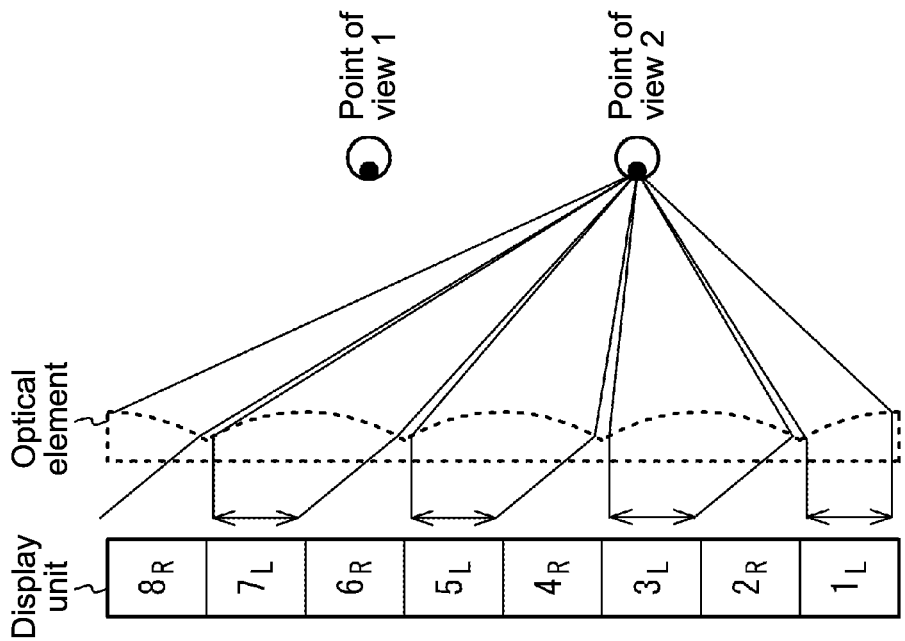
FIG. 30A and FIG. 30B are conceptual diagrams of a glasses-free display apparatus.
Figure 30A:
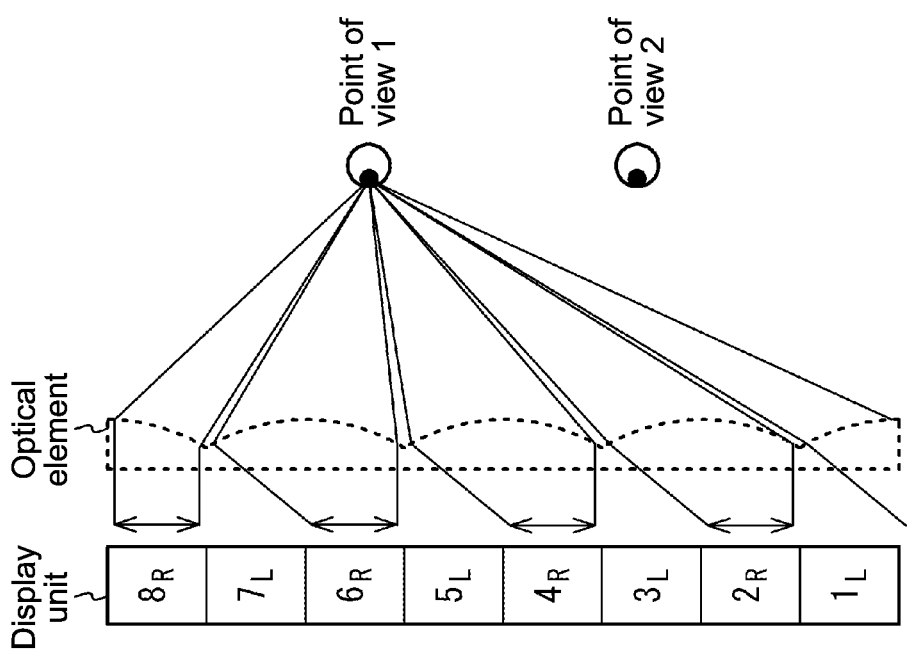

FIG. 29 shows an external view of a television set to which the display apparatus according to the embodiment described above is applied. A television set 300 includes a video display screen unit 301, for example. The video display screen unit 301 is configured by the display apparatus according to the embodiment. By applying the display apparatus according to the embodiment described above, a stereoscopic image with less crosstalk can be displayed, which can contribute to an enhancement of quality of the television set 300.

In the above, the embodiment of the present technology is specifically described. The present technology is not limited to the above embodiment, and various modifications based on the technical idea of the present technology can be performed. For example, the numerical values, structures, substrates, materials, processes, and the like cited in the above embodiment are merely examples, and different numerical values, structures, substrates, materials, processes, and the like may be used when necessary.

It should be noted that the present technology can take the following configurations.

[A1] A display apparatus, including:
a display unit having a display area in which a two-dimensional image is displayed; and
an optical element configured by disposing a plurality of structural bodies for separating the image displayed in the display area into images observed at predetermined observation positions arranged at intervals in a horizontal direction, in which
in the display area, pixels are arranged in a matrix pattern in the horizontal direction and in a vertical direction, and pixels having different planar shapes are arranged for each row in a certain cycle, and
the structural bodies of the optical element are disposed to be tilted at an inclination which satisfies $(J+0.5)/3$ (J: integer of 3 or more) with respect to the vertical direction with a number of pixels as a unit.

[A2] The display apparatus according to [A1] above, in which
the pixels in the display area constitute groups each including three pixels arranged in a row direction, and
when a horizontal pitch of the structural bodies of the optical element with the number of pixels as a unit is represented by a symbol $LM_X$,
an inclination of the structural bodies with the number of pixels as a unit is represented by a symbol SL,
a vertical displacement between a vertical center position of a given color of a pixel group observed through a given structural body and a vertical center position of the given color of a pixel group observed through a structural body arranged with one structural body intervened with respect to the given structural body with the number of pixels as a unit is represented by a symbol OFS, and
the number of pixel groups included in a horizontal width between a pixel observed through a given structural body and a pixel observed through a structural body arranged with one structural body intervened with respect to the given structural body is represented by a symbol NP,
the symbol $LM_X$ is a non-integer,
the symbol NP is an odd number, and
$2 \cdot LM_X = 3 \cdot NP + (OFS/SL)$ is established.

[A3] The display apparatus according to [A1] or [A2] above, in which
in the display area, two kinds of pixels having different planar shapes are arranged alternately for each row.

[A4] The display apparatus according to any one of [A1] to [A3] above, in which
the display unit is constituted of a liquid crystal display panel.

[A5] The display apparatus according to any one of [A1] to [A4] above, in which
the optical element includes
a base material, and
a lenticular lens unit that is formed on the base material, and is configured by arranging a plurality of lenses that constitute the structural bodies, and
a gap between the lenticular lens unit and a flat plate which faces the lenticular lens unit is filled with a resin layer having a refractive index different from that of a material that constitutes the lenticular lens unit.

[A6] The display apparatus according to [A5] above, in which the lens that constitutes the structural body has an aspherical shape.

[A7] The display apparatus according to [A5] or [A6] above, in which
the lens that constitutes the structural body has a convex lens shape, and
the resin layer is made of a resin material having a refractive index lower than that of a material that constitutes the structural body.

[A8] The display apparatus according to [A7] above, in which
the refractive index of the resin layer is a value of 1.2 to 1.4.

[A9] The display apparatus according to [A5] or [A6] above, in which
the lens that constitutes the structural body has a concave lens shape, and
the resin layer is made of a resin material having a refractive index higher than that of a material that constitutes the structural body.

[A10] The display apparatus according to [A9] above, in which the refractive index of the resin layer is a value of 1.6 to 1.8.

[A11] The display apparatus according to any one of [A5] to [A10] above, in which
the resin layer has a thickness of 40 μm or more.

[A12] The display apparatus according to any one of [A5] to [A11] above, in which
the resin layer has an E hardness of 30 or less.

[A13] The display apparatus according to any one of [A5] to [A12] above, in which
the resin layer has an elastic modulus of 500 kPa or less.

[A14] The display apparatus according to any one of [A5] to [A13] above, in which
the resin layer is made of an ultraviolet curable resin material.

[B1] An optical element, including:
a base material; and
a lenticular lens unit that is formed on the base material, and is configured by arranging a plurality of lenses that constitute the structural bodies, in which
a gap between the lenticular lens unit and a flat plate which faces the lenticular lens unit is filled with a resin layer having a refractive index different from that of a material that constitutes the lenticular lens unit.

[B2] The optical element according to [B1] above, in which
the lens that constitutes the structural body has an aspherical shape.

[B3] The optical element according to [B1] or [B2] above, in which
the lens that constitutes the structural body has a convex lens shape, and
the resin layer is made of a resin material having a refractive index lower than that of a material that constitutes the structural body.

[B4] The optical element according to [B3] above, in which
the refractive index of the resin layer is a value of 1.2 to 1.4.

[B5] The optical element according to [B1] or [B2] above, in which
the lens that constitutes the structural body has a concave lens shape, and
the resin layer is made of a resin material having a refractive index higher than that of a material that constitutes the structural body.

[B6] The optical element according to [B5] above, in which
the refractive index of the resin layer is a value of 1.6 to 1.8.

[B7] The optical element according to any one of [B1] to [B6] above, in which
the resin layer has a thickness of 40 μm or more.

[B8] The optical element according to any one of [B1] to [B7] above, in which
the resin layer has an E hardness of 30 or less.

[B9] The optical element according to any one of [B1] to [B8] above, in which
the resin layer has an elastic modulus of 500 kPa or less.

[B10] The optical element according to any one of [B1] to [B9] above, in which
the resin layer is made of an ultraviolet curable resin material.

[B11] The optical element according to any one of [B1] to [B10] above, in which
the flat plate is made of a liquid crystal display panel.

[C1] An electronic apparatus, including:
a display apparatus including
a display unit having a display area in which a two-dimensional image is displayed, and
an optical element configured by disposing a plurality of structural bodies for separating the image displayed in the display area into images observed at predetermined observation positions arranged at intervals in a horizontal direction, in which
in the display area, pixels are arranged in a matrix pattern in the horizontal direction and in a vertical direction, and pixels having different planar shapes are arranged for each row in a certain cycle, and
the structural bodies of the optical element are disposed to be tilted at an inclination which satisfies (J+0.5)/3 (J: integer of 3 or more) with respect to the vertical direction with a number of pixels as a unit.

[C2] The electronic apparatus according to [C1] above, in which
the pixels in the display area constitute groups each including three pixels arranged in a row direction, and
when a horizontal pitch of the structural bodies of the optical element with the number of pixels as a unit is represented by a symbol $LM_X$,
an inclination of the structural bodies with the number of pixels as a unit is represented by a symbol SL,
a vertical displacement between a vertical center position of a given color of a pixel group observed through a given structural body and a vertical center position of the given color of a pixel group observed through a structural body arranged with one structural body intervened with respect to the given structural body with the number of pixels as a unit is represented by a symbol OFS, and
the number of pixel groups included in a horizontal width between a pixel observed through a given structural body and a pixel observed through a structural body arranged with one structural body intervened with respect to the given structural body is represented by a symbol NP,
the symbol $LM_X$ is a non-integer,
the symbol NP is an odd number, and
$2 \cdot LM_X = 3 \cdot NP + (OFS/SL)$ is established.

[C3] The electronic apparatus according to [C1] or [C2] above, in which
in the display area, two kinds of pixels having different planar shapes are arranged alternately for each row.

[C4] The electronic apparatus according to any one of [C1] to [C3] above, in which
the display unit is constituted of a liquid crystal display panel.

[C5] The electronic apparatus according to any one of [C1] to [C4] above, in which
the optical element includes
a base material, and
a lenticular lens unit that is formed on the base material, and is configured by arranging a plurality of lenses that constitute the structural bodies, and
a gap between the lenticular lens unit and a flat plate which faces the lenticular lens unit is filled with a resin layer having a refractive index different from that of a material that constitutes the lenticular lens unit.

[C6] The electronic apparatus according to [C5] above, in which
the lens that constitutes the structural body has an aspherical shape.

[C7] The electronic apparatus according to [C5] or [C6] above, in which
the lens that constitutes the structural body has a convex lens shape, and
the resin layer is made of a resin material having a refractive index lower than that of a material that constitutes the structural body.

[C8] The electronic apparatus according to [C7] above, in which the refractive index of the resin layer is a value of 1.2 to 1.4.

[C9] The electronic apparatus according to [C5] or [C6] above, in which
the lens that constitutes the structural body has a concave lens shape, and
the resin layer is made of a resin material having a refractive index higher than that of a material that constitutes the structural body.

[C10] The electronic apparatus according to [C9] above, in which
the refractive index of the resin layer is a value of 1.6 to 1.8.

[C11] The electronic apparatus according to any one of [C5] to [C10] above, in which
the resin layer has a thickness of 40 μm or more.

[C12] The electronic apparatus according to any one of [C5] to [C11] above, in which
the resin layer has an E hardness of 30 or less.

[C13] The electronic apparatus according to any one of [C5] to [C12] above, in which
the resin layer has an elastic modulus of 500 kPa or less.

[C14] The electronic apparatus according to any one of [C5] to [C13] above, in which
the resin layer is made of an ultraviolet curable resin material.

REFERENCE SIGNS LIST 1 display apparatus
10 display unit
11 display area
12 pixel
13 polarization plate
14 substrate
15 liquid crystal material layer
16 substrate
17 polarization plate
20 illumination unit
21 light emission surface
30 optical element
31 structural body (lenticular lens unit)
31' material layer
32 base material
33 resin layer
33' material layer
34 film
35 bonding layer
32 base material
40 optical element
41 structural body
42 base material
43 low refractive resin layer
44 front surface plate
45 substrate
100 drive unit
200, 200' smart phone
200, 201' video display screen unit
300 television set
301 video display screen unit
BM black matrix
DR right-eye image data
DL left-eye image data
$A_1$ to $A_U$ observation position
SL inclination of structural body
$PL_X$ X directional pitch of pixel
$PL_Y$ Y directional pitch of pixel
$GPL_X$ X directional pitch of pixel group
$LM_X$ X directional pitch of structural body

The invention claimed is:

1. A display apparatus, comprising:
a display unit having a display area, wherein
the display unit is configured to display a two-dimensional image,
in the display area, a plurality of pixels is arranged in a horizontal direction and a vertical direction, and
the plurality of pixels having different planar shapes is arranged in a specific cycle for each row of the display area; and
an optical element including a plurality of structural bodies, wherein
the plurality of structural bodies separates the image displayed in the display area into a plurality of images observed at specific observation positions,
the specific observation positions are arranged at intervals in the horizontal direction,
the plurality of structural bodies on the optical element is tilted at an inclination with respect to the vertical direction with a specific number of pixels of the plurality of pixels as a unit, and
the inclination satisfies (J+0.5)/3, wherein
J is an integer of 3 or more,
J indicates a number of pixels between a first pixel of the specific number of pixels and a second pixel of the specific number of pixels, in the vertical direction, and
the first pixel and the second pixel are of same color.

2. The display apparatus according to claim 1, wherein
the plurality of pixels in the display area constitute a plurality of pixel groups, wherein each pixel group of the plurality of pixel groups includes three pixels arranged in a row direction, and
when
a horizontal pitch of the plurality of structural bodies of the optical element with the specific number of pixels as the unit is represented by a symbol $LM_X$,
the inclination of the plurality of structural bodies with the specific number of pixels as the unit is represented by a symbol SL,
a vertical displacement between a vertical center position of the first pixel observed through a first structural body of the plurality of structural bodies and a vertical center position of the second pixel observed through a second structural body arranged with one structural body intervened with respect to the first structural body with the specific number of pixels as the unit is represented by a symbol OFS, wherein the first pixel and the second pixel of the specific number of pixels are of the same color of a first pixel group of the plurality of pixel groups, and
the plurality of pixel groups included in a horizontal width between the first pixel and the second pixel is represented by a symbol NP,
$2 \cdot LM_X = 3 \cdot NP + (OFS/SL)$, wherein the symbol $LM_X$ is a non-integer, and
the symbol NP is an odd number.

3. The display apparatus according to claim 1, wherein in the display area, two kinds of pixels having different planar shapes are arranged alternately for each row.

4. The display apparatus according to claim 1, wherein the display unit is constituted of a liquid crystal display panel.

5. The display apparatus according to claim 1, wherein the optical element includes a base material, and a lenticular lens unit on the base material, and is configured to arrange a plurality of lenses that constitute the plurality of structural bodies, and a gap between the lenticular lens unit and a liquid crystal display panel of the display unit is filled with a resin layer having a refractive index different from that of a material that constitutes the lenticular lens unit, wherein the liquid crystal display panel faces the lenticular lens unit.

6. An electronic apparatus, comprising:

a display apparatus including a display unit having a display area, wherein the display unit is configured to display a two-dimensional image, in the display area, a plurality of pixels is arranged in a horizontal direction and a vertical direction, and the plurality of pixels having different planar shapes is arranged in a specific cycle for each row of the display area; and an optical element including a plurality of structural bodies, wherein the plurality of structural bodies separates the image displayed in the display area into a plurality of images observed at specific observation positions, the specific observation positions are arranged at intervals in the horizontal direction, the plurality of structural bodies on the optical element is tilted at an inclination with respect to the vertical direction with a specific number of pixels of the plurality of pixels as a unit, and the inclination satisfies $(J+0.5)/3$, wherein J is an integer of 3 or more, J indicates a number of pixels between a first pixel of the specific number of pixels and a second pixel of the specific number of pixels, in the vertical direction, and the first pixel and the second pixel are of same color.

* * * * *